US012670223B2

(12) United States Patent
Dabbiru et al.

(10) Patent No.: US 12,670,223 B2
(45) Date of Patent: Jun. 30, 2026

(54) SEARCH SYSTEM HAVING TASK-BASED MACHINED-LEARNED MODELS

(71) Applicant: Google LLC, Mountain View, CA (US)

(72) Inventors: Lakshmi Kumar Dabbiru, Santa Clara, CA (US); Abhishek Shrivastava, San Jose, CA (US); Hinali Naimish Marfatia, Milpitas, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/390,806

(22) Filed: Dec. 20, 2023

(65) Prior Publication Data

US 2025/0209127 A1     Jun. 26, 2025

(51) Int. Cl.
*G06F 16/95* (2019.01)
*G06F 16/9538* (2019.01)
*G06F 16/954* (2019.01)

(52) U.S. Cl.
CPC ........ *G06F 16/954* (2019.01); *G06F 16/9538* (2019.01)

(58) Field of Classification Search
CPC .................................................... G06F 16/954
See application file for complete search history.

(56) References Cited

U.S. PATENT DOCUMENTS

| | | | | |
|---|---|---|---|---|
| 9,342,834 | B2 * | 5/2016 | Singh ..................... | G06Q 30/02 |
| 9,471,649 | B1 * | 10/2016 | Hong .................... | G06F 16/951 |
| 9,727,614 | B1 * | 8/2017 | Sarmento ............ | G06F 16/2457 |
| 10,304,111 | B1 * | 5/2019 | Sarmento ........... | G06Q 30/0613 |
| 10,324,606 | B1 * | 6/2019 | Nair .................... | G06F 3/04847 |
| 11,429,406 | B1 * | 8/2022 | Krishnamoorthy .... | G06V 20/46 |
| 11,734,379 | B1 * | 8/2023 | Ranganathan ........ | G06F 3/0483 |
| | | | | 715/234 |
| 2007/0130124 | A1 | 6/2007 | Ramset et al. | |
| 2008/0177726 | A1 | 7/2008 | Forbes et al. | |
| 2012/0158685 | A1 | 6/2012 | White et al. | |

(Continued)

OTHER PUBLICATIONS

International Search Report and Written Opinion for Application No. PCT/US2024/057755, mailed Jan. 13, 2025, 11 pages.

(Continued)

*Primary Examiner* — Mohammad S Rostami
(74) *Attorney, Agent, or Firm* — DORITY & MANNING P.A.

(57)     ABSTRACT

A task-based search system is described. The computing system can receive, from a user device, a first user query associated with a task. The system can determine, using one or more machine-learned models, a first subtask having a first interaction score and a second subtask having a second user interaction score. Additionally, the system can perform a first query search for the first subtask to obtain a first content item associated with the first subtask. Moreover, the system can perform a second query search for the second subtask to obtain a second content item associated with the second subtask. Furthermore, the system can cause a presentation, on a display of the user device, of the first content item and the second content item. The first content item can be displayed above the second content item based on the first user interaction score being higher than the second user interaction score.

20 Claims, 10 Drawing Sheets

100

(56)                References Cited

U.S. PATENT DOCUMENTS

| 2014/0074627 | A1  | 3/2014  | Kucharz et al. | |
| 2014/0074824 | A1* | 3/2014  | Rad | G06Q 50/01 |
| | | | | 707/722 |
| 2014/0156383 | A1  | 6/2014  | Vijayaraghavan et al. | |
| 2015/0160817 | A1* | 6/2015  | Hwang | G06F 16/9038 |
| | | | | 707/E17.014 |
| 2015/0186938 | A1  | 7/2015  | Zhang et al. | |
| 2016/0125036 | A1* | 5/2016  | Hanson | G06F 16/435 |
| | | | | 707/733 |
| 2016/0125043 | A1* | 5/2016  | Shelkey | G06Q 10/10 |
| | | | | 707/722 |
| 2017/0046356 | A1* | 2/2017  | Marantz | G06F 16/242 |
| 2019/0382007 | A1* | 12/2019 | Casas | G06V 10/764 |
| 2020/0125568 | A1* | 4/2020  | Idicula | G06N 20/20 |
| 2022/0147861 | A1* | 5/2022  | Oltramari | G06N 3/088 |
| 2022/0277056 | A1* | 9/2022  | Astrakhantsev | G06F 40/14 |
| 2023/0095006 | A1* | 3/2023  | Riva | G06F 40/20 |
| | | | | 715/762 |
| 2023/0095973 | A1* | 3/2023  | Rad | G06F 3/0482 |
| | | | | 707/723 |
| 2023/0297603 | A1* | 9/2023  | M'hamdi | G06N 20/00 |
| | | | | 704/9 |
| 2023/0367818 | A1* | 11/2023 | Han | G06F 16/90335 |
| 2024/0054573 | A1* | 2/2024  | Methai | G06Q 10/10 |
| 2024/0112074 | A1* | 4/2024  | Chisholm | G06N 20/00 |
| 2024/0220518 | A1* | 7/2024  | Stowell | G06F 16/3347 |
| 2024/0281472 | A1* | 8/2024  | LaRhette | G06F 16/248 |
| 2024/0330993 | A1* | 10/2024 | Al-Qurishi | G06F 40/20 |
| 2025/0007790 | A1* | 1/2025  | Marwah | H04L 41/16 |

OTHER PUBLICATIONS

FreeCodeCamp, "How to Communicate with ChatGPT—A Guide to Prompt Engineering", Apr. 20, 2023, https://www.freecodecamp. org/news/how-to-communicate-with-ai-tools-prompt-engineering/, retrieved on Jul. 30, 2024, 15 pages.
GeeksforGeeks, "Targeted Advertising Using Machine Learning", Mar. 1, 2023, https://www.geeksforgeeks.org/targeted-advertising-using-machine-learning/, retrieved on Jul. 30, 2024, 7 pages.
Zendesk Help, "About Semantic Search and How it Works", Jun. 21, 2024, https://support.zendesk.com/hc/en-us/articles/5633225532826-About-semantic-search-and-how-it-works, retrieved on Jul. 30, 2024, 16 pages.

* cited by examiner

300

400

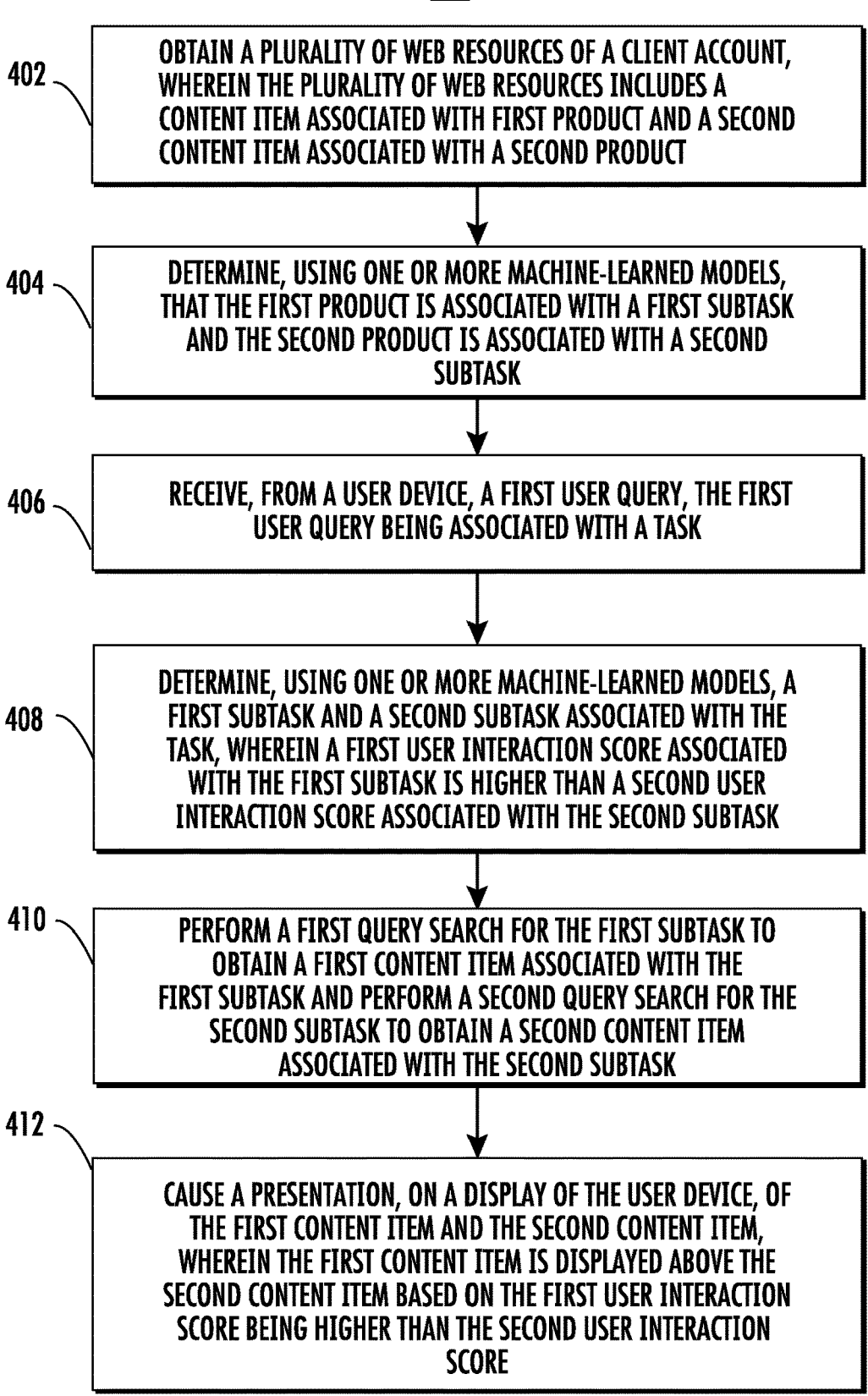

402 — OBTAIN A PLURALITY OF WEB RESOURCES OF A CLIENT ACCOUNT, WHEREIN THE PLURALITY OF WEB RESOURCES INCLUDES A CONTENT ITEM ASSOCIATED WITH FIRST PRODUCT AND A SECOND CONTENT ITEM ASSOCIATED WITH A SECOND PRODUCT

404 — DETERMINE, USING ONE OR MORE MACHINE-LEARNED MODELS, THAT THE FIRST PRODUCT IS ASSOCIATED WITH A FIRST SUBTASK AND THE SECOND PRODUCT IS ASSOCIATED WITH A SECOND SUBTASK

406 — RECEIVE, FROM A USER DEVICE, A FIRST USER QUERY, THE FIRST USER QUERY BEING ASSOCIATED WITH A TASK

408 — DETERMINE, USING ONE OR MORE MACHINE-LEARNED MODELS, A FIRST SUBTASK AND A SECOND SUBTASK ASSOCIATED WITH THE TASK, WHEREIN A FIRST USER INTERACTION SCORE ASSOCIATED WITH THE FIRST SUBTASK IS HIGHER THAN A SECOND USER INTERACTION SCORE ASSOCIATED WITH THE SECOND SUBTASK

410 — PERFORM A FIRST QUERY SEARCH FOR THE FIRST SUBTASK TO OBTAIN A FIRST CONTENT ITEM ASSOCIATED WITH THE FIRST SUBTASK AND PERFORM A SECOND QUERY SEARCH FOR THE SECOND SUBTASK TO OBTAIN A SECOND CONTENT ITEM ASSOCIATED WITH THE SECOND SUBTASK

412 — CAUSE A PRESENTATION, ON A DISPLAY OF THE USER DEVICE, OF THE FIRST CONTENT ITEM AND THE SECOND CONTENT ITEM, WHEREIN THE FIRST CONTENT ITEM IS DISPLAYED ABOVE THE SECOND CONTENT ITEM BASED ON THE FIRST USER INTERACTION SCORE BEING HIGHER THAN THE SECOND USER INTERACTION SCORE

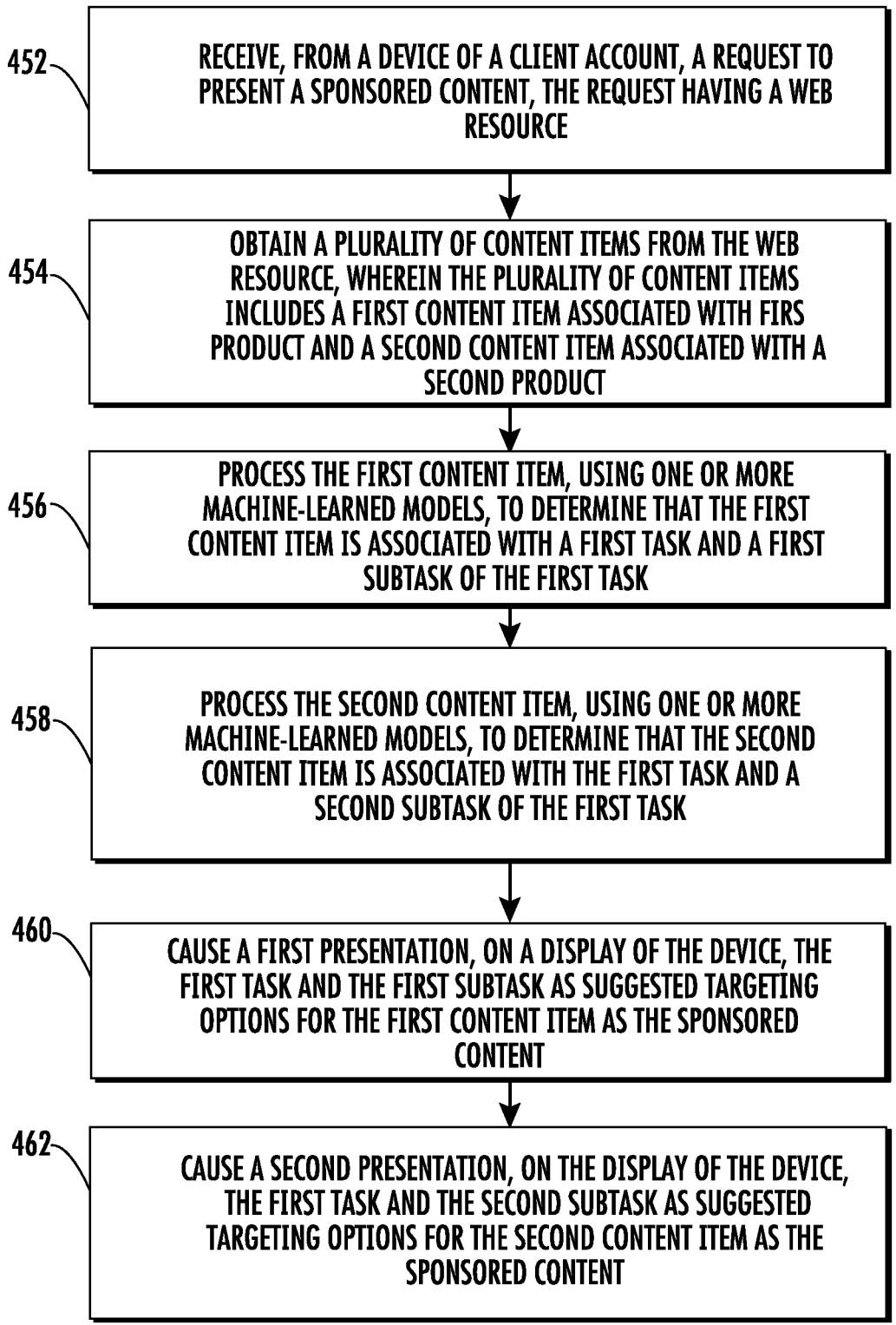

RECEIVE, FROM A DEVICE OF A CLIENT ACCOUNT, A REQUEST TO PRESENT A SPONSORED CONTENT, THE REQUEST HAVING A WEB RESOURCE

452

OBTAIN A PLURALITY OF CONTENT ITEMS FROM THE WEB RESOURCE, WHEREIN THE PLURALITY OF CONTENT ITEMS INCLUDES A FIRST CONTENT ITEM ASSOCIATED WITH FIRS PRODUCT AND A SECOND CONTENT ITEM ASSOCIATED WITH A SECOND PRODUCT

454

PROCESS THE FIRST CONTENT ITEM, USING ONE OR MORE MACHINE-LEARNED MODELS, TO DETERMINE THAT THE FIRST CONTENT ITEM IS ASSOCIATED WITH A FIRST TASK AND A FIRST SUBTASK OF THE FIRST TASK

456

PROCESS THE SECOND CONTENT ITEM, USING ONE OR MORE MACHINE-LEARNED MODELS, TO DETERMINE THAT THE SECOND CONTENT ITEM IS ASSOCIATED WITH THE FIRST TASK AND A SECOND SUBTASK OF THE FIRST TASK

458

CAUSE A FIRST PRESENTATION, ON A DISPLAY OF THE DEVICE, THE FIRST TASK AND THE FIRST SUBTASK AS SUGGESTED TARGETING OPTIONS FOR THE FIRST CONTENT ITEM AS THE SPONSORED CONTENT

460

CAUSE A SECOND PRESENTATION, ON THE DISPLAY OF THE DEVICE, THE FIRST TASK AND THE SECOND SUBTASK AS SUGGESTED TARGETING OPTIONS FOR THE SECOND CONTENT ITEM AS THE SPONSORED CONTENT

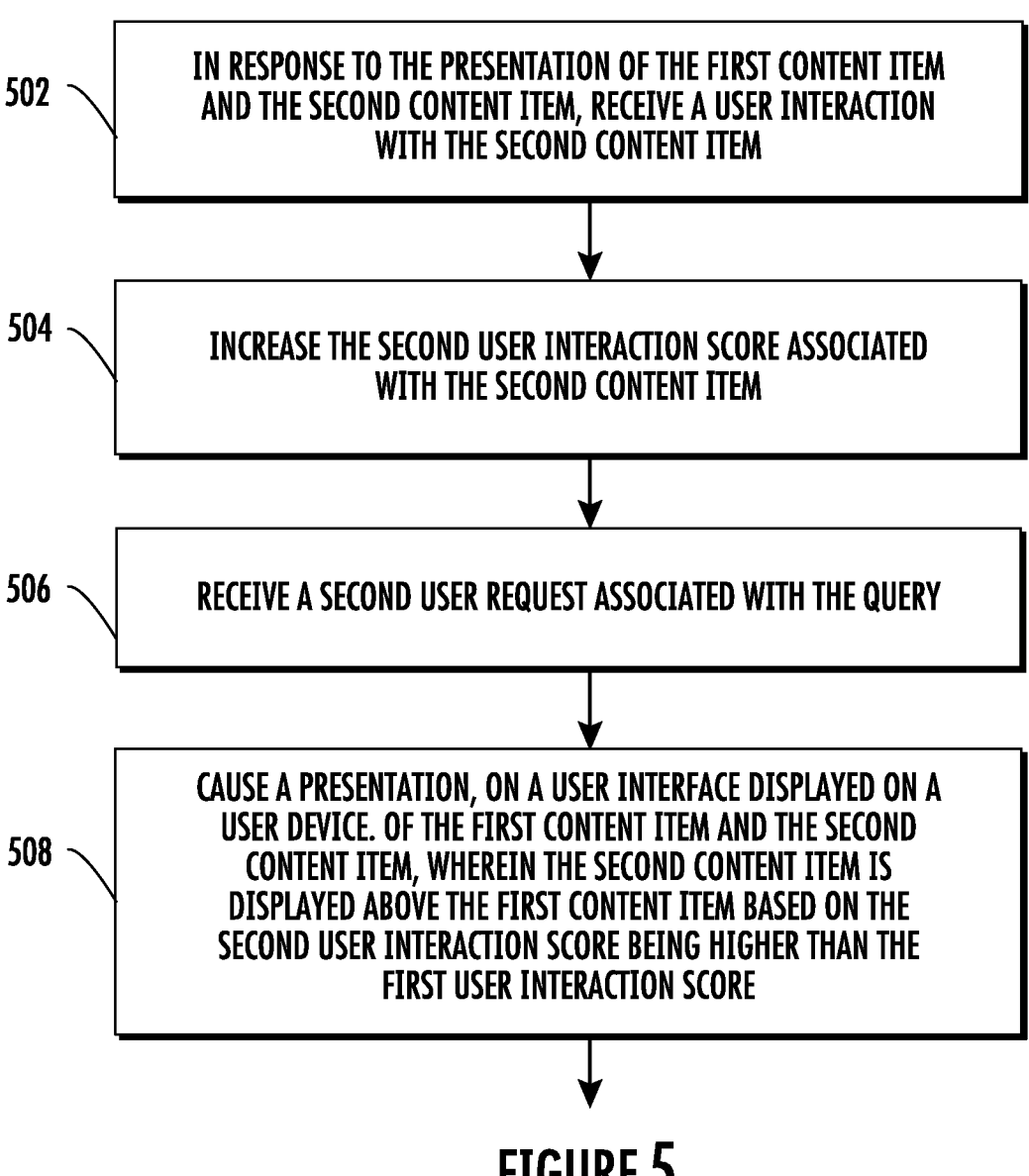

500

502 — IN RESPONSE TO THE PRESENTATION OF THE FIRST CONTENT ITEM AND THE SECOND CONTENT ITEM, RECEIVE A USER INTERACTION WITH THE SECOND CONTENT ITEM

504 — INCREASE THE SECOND USER INTERACTION SCORE ASSOCIATED WITH THE SECOND CONTENT ITEM

506 — RECEIVE A SECOND USER REQUEST ASSOCIATED WITH THE QUERY

508 — CAUSE A PRESENTATION, ON A USER INTERFACE DISPLAYED ON A USER DEVICE. OF THE FIRST CONTENT ITEM AND THE SECOND CONTENT ITEM, WHEREIN THE SECOND CONTENT ITEM IS DISPLAYED ABOVE THE FIRST CONTENT ITEM BASED ON THE SECOND USER INTERACTION SCORE BEING HIGHER THAN THE FIRST USER INTERACTION SCORE

602 — OBTAINING A TRAINING INSTANCE HAVING CONTENT PROVIDER DATA AND RLHF DATA

604 — PROCESSING, USING THE MULTI-TASK MACHINE-LEARNED MODEL, THE TRAINING INSTANCE TO GENERATE AN OUTPUT

606 — RECEIVING AN EVALUATION SIGNAL ASSOCIATED WITH THE OUTPUT, THE EVALUATION SIGNAL HAVING RLHF DATA

608 — UPDATING THE MULTI-TASK MACHINE-LEARNED MODEL USING THE EVALUATION SIGNAL

SEARCH SYSTEM HAVING TASK-BASED MACHINED-LEARNED MODELS

FIELD

The present disclosure relates generally to machine learning processes and machine-learned devices and systems. More particularly, the present disclosure relates to using a multi-task machine-learned model for providing generative responses to task-based queries.

BACKGROUND

A computer can receive input(s). The computer can execute instructions to process the input(s) to generate output(s) using a parameterized model. The computer can obtain feedback on its performance in generating the outputs with the model. The computer can generate feedback by evaluating its performance. The computer can receive feedback from an external source. The computer can update parameters of the model based on the feedback to improve its performance. In this manner, the computer can iteratively "learn" to generate the desired outputs. The resulting model is often referred to as a machine-learned model.

Preventing sensitive client information from being used by a large language model (LLM) involves implementing appropriate measures, such as data filtering and limiting access. For example, before feeding data into the LLM, the sensitive client information should be filtered out. Additionally, for custom models that are trained using client information, permission controls should be set to restrict access to the custom models to only authorized users. By combining these measures, the risk of sensitive information being used inappropriately by a large language model can be minimized.

SUMMARY

Aspects and advantages of embodiments of the present disclosure will be set forth in part in the following description, or can be learned from the description, or can be learned through practice of the embodiments.

One example aspect of the present disclosure is a computing system having one or more processors and one or more non-transitory computer-readable media storing instructions that are executable by the one or more processors to cause the computing system to perform operations. The operations can include receiving, from a user device, a first user query. The first user query can be associated with a task. Additionally, the operations can include determining, using one or more machine-learned models, a first subtask and a second subtask associated with the task. A first user interaction score associated with the first subtask is higher than a second user interaction score associated with the second subtask. Moreover, the operations can include performing a first query search for the first subtask to obtain a first content item associated with the first subtask. Furthermore, the operations can include performing a second query search for the second subtask to obtain a second content item associated with the second subtask. Subsequently, the operations can include causing a presentation, on a display of the user device, of the first content item and the second content item. The first content item can be displayed above the second content item based on the first user interaction score being higher than the second user interaction score.

In some instances, the interaction score of a content item can be calculated based on an aggregation of a plurality of users interacting with the content item. The interaction score can further be calculated based on a first user interaction, using the user device, in response to the presentation of the first content item and the second content item In some instances, the operations can include obtaining, from a content provider, a plurality of web resources of a client account. The plurality of web resources can include the first content item associated with first product and the second content item associated with a second product. Additionally, the operations can include determining, using one or more machine-learned models, that the first product is associated with a first subtask and the second product is associated with a second subtask, wherein the first content item is presented on the display of the user device.

In some instances, the operations can include causing a presentation, on a user interface of the content provider, the first subtask as a potential targeting of a sponsored content for the first content item.

In some instances, the one or more machine-learned models can include a multi-task machine-learned model, and the multi-task machine-learned model can be trained using content provider data of the content provider.

In some instances, in response to the presentation of the first content item and the second content item, the operations can include receiving a user interaction with the second content item. Additionally, the operations can include increasing the second user interaction score associated with the second content item. Moreover, the operations can include receiving, from the user device, a second user request associated with the task. Furthermore, the operations can include causing a presentation, on the display of the user device, of the first content item and the second content item, wherein the second content item is displayed above the first content item based on the second user interaction score being higher than the first user interaction score.

In some instances, the one or more machine-learned models include a multi-task machine-learned model, and wherein the multi-task machine-learned model is trained using reinforcement learning from human feedback (RLHF) data, the RLHF data including the user interaction with the second content item.

In some instances, in response to the presentation of the first content item and the second content item, the operations can include receiving a user interaction with the second content item. Additionally, the operations can include increasing the second user interaction score associated with the second content item. Moreover, the operations can include receiving, from the user device, a scrolling command associated with scrolling of a search result page, the search result page displaying the first content item and the second content item. Furthermore, the operations can include dynamically updating the search result page to include a third content item as the search result page is being scrolled, the third content item being associated with the second subtask.

In some instances, in response to the presentation of the first content item and the second content item in a first search result page, the operations can include receiving a user interaction with the second content item. Additionally, the operations can include increasing the second user interaction score associated with the second content item. Moreover, the operations can include receiving, from the user device, a next page command associated with presenting a second search result page. Furthermore, the operations can include generating the second search result page, wherein the second search result page includes a third content item, the third content item being associated with the second subtask.

In some instances, the operations can include processing the first user query, using one or more machine-learned models, to determine whether is associated with a specific task. Additionally, based on the determination that the first user query is associated with the specific task, the operations can include processing the first user query, using a multi-task machine-learned model, to determine the first subtask and the second subtask of the specific task.

In some instances, the operations can include receiving, from the user device, a second user request. Additionally, the operations can include processing the second user query, using one or more machine-learned models, to determine whether is associated with one or more tasks. Moreover, based on the determination that the second user query is not associated with the one or more tasks, the operations can include processing the second user query, using a large language model, to determine a response to the second user query.

In some instances, the one or more machine-learned models can include a multi-task machine-learned model and a large language model.

In some instances, the multi-task machine-learned model can generate a search result page based on user interactions. Additionally, the search result page includes a sponsored content that is associated with the first subtask, the sponsored content being generated by the multi-task machine-learned model based on a user interaction with the first content item.

In some instances, the operations can include determining whether a user query is associated with one or more tasks. Additionally, the operations can include processing the user query using the multi-task machine-learned model when determined that the user query is associated with the one or more tasks. Moreover, the operations can include processing the user query using the large language model when determined that the user query is not associated with the one or more tasks.

Another example aspect of the present disclosure is directed to a computer-implemented method. The method can include receiving, by a computing system comprising one or more processors, a first user query from a user device. The first user query can be associated with a task. Additionally, the method can include determining, using one or more machine-learned models, a first subtask and a second subtask associated with the task, wherein a first user interaction score associated with the first subtask is higher than a second user interaction score associated with the second subtask. Moreover, the method can include performing a first query search for the first subtask to obtain a first content item associated with the first subtask. Furthermore, the method can include performing a second query search for the second subtask to obtain a second content item associated with the second subtask. Subsequently, the method can include causing a presentation, on a display of the user device, of the first content item and the second content item, wherein the first content item is displayed above the second content item based on the first user interaction score being higher than the second user interaction score.

Another example aspect of the present disclosure is directed to one or more non-transitory computer-readable media that collectively store a first set of instructions that, when executed by one or more processors of a computing system, cause the computing system to perform operations. The operations can include receiving, from a user device, a first user query. The first user query can be associated with a task. Additionally, the operations can include determining, using one or more machine-learned models, a first subtask and a second subtask associated with the task. A first user interaction score associated with the first subtask is higher than a second user interaction score associated with the second subtask. Moreover, the operations can include performing a first query search for the first subtask to obtain a first content item associated with the first subtask. Furthermore, the operations can include performing a second query search for the second subtask to obtain a second content item associated with the second subtask. Subsequently, the operations can include causing a presentation, on a display of the user device, of the first content item and the second content item. The first content item can be displayed above the second content item based on the first user interaction score being higher than the second user interaction score.

Other example aspects of the present disclosure are directed to other systems, methods, apparatuses, tangible non-transitory computer-readable media, and devices for performing functions described herein. These and other features, aspects, and advantages of various implementations will become better understood with reference to the following description and appended claims. The accompanying drawings, which are incorporated in and constitute a part of this specification, illustrate implementations of the present disclosure and, together with the description, help explain the related principles.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 4A depicts a flow chart diagram of an example method to perform a search with a server having a multi-task machine-learned model according to example embodiments of the present disclosure.

FIG. 4B depicts a flow chart diagram of an example method to generate sponsored content that can, using a multi-task machine-learned model, target tasks and/or subtasks according to example embodiments of the present disclosure.

FIG. 5 depicts a flow chart diagram of an example method to generate a dynamic search result page according to example embodiments of the present disclosure.

Figure 1:
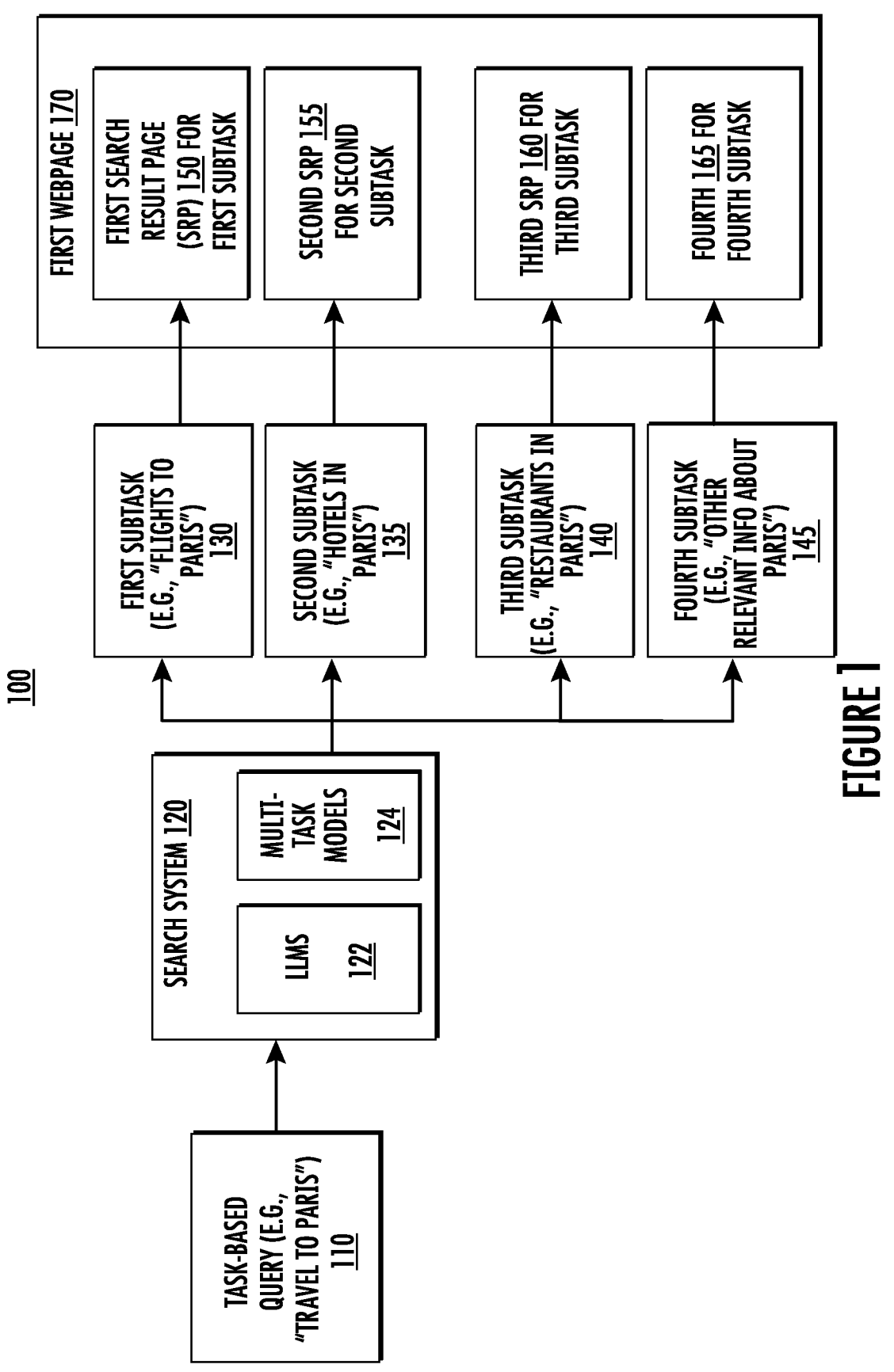
FIG. 1 depicts a flow diagram of a search system with a multi-task machine-learned model according to example embodiments of the present disclosure.

Reference numerals that are repeated across plural figures are intended to identify the same features in various implementations.

DETAILED DESCRIPTION

Generally, the present disclosure is directed to a search system having one or more machine-learned models to determine subtasks of a task-based query. For example, in response to receiving the task-based query, the search system can present search results based on the determined subtasks. This improved search results that is based on the determined subtask can improve the usability and functionality of the user interface by a user. Additionally, content providers can better target their products and services to applicable users based on task and/or subtask targeting.

Additionally, according to some embodiments, the system enables content providers the ability to target tasks and/or subtasks that are automatically generated by one or more machine-learned models. In conventional systems, content providers may only be able to target a query and may not be able to target a task. A task can be more abstract and overarching concepts in comparison to a query. For example, a task can include a plurality of subtasks. Moreover, a subtask can be a plurality of queries that represent how to achieve an outcome. Using the techniques described herein, the system enables content providers the ability to uplevel or broaden their targeting for sponsored content, which still be relevant towards an outcome (e.g., booking a flight ticket).

Conventional search targeting technologies can be typically based on broad queries. In some instances, a task-based query, such as "travel to Paris" can be that broad query but the challenge is these broad queries may not map to how new search result pages are organized around LLM subtasks. A user can perform a search using a search engine with a task-based query even though the user may actually have a task, and not a question, that requires assistance. For example, a user may perform a plurality of queries over several days to assist with planning a trip to a new city. Conventional search engines and conventional search targeting technologies are optimized for query level and may not be optimized for high-level tasks, such as "plan for travel" or "prepare a meal."

According to some embodiments, the search system, using machine-learned search engine techniques, can break down a user request into a plurality of subtasks. For example, the user request can be for the search engine to plan for a trip or prepare a meal. In response to the request, the search engine can generate a plurality of subtasks associated with the user request and a plurality of links for each task in the plurality of subtasks.

Additionally, the search system can utilize multi-task machine-learned models trained to generate tasks and subtasks that are specific for content providers to target. In some instances, the multi-task machine-learned models can divide tasks based on general website information and user's reinforcement learning from human feedback (RLHF). The subtasks can be compatible with the terminology of content providers and information (e.g., best practices) associated with the specific industry associated with the task. Additionally, the multi-task machine-learned models can generate a subset of subtasks, such as "flights and hotels" or "hotels and rental cars" to be presented to content providers.

Moreover, the search system includes a user interface that enables content providers to provide sponsored content for targeted tasks and/or subtasks. For example, multi-task machine-learned models can generate tasks and subtasks that are presented to the content provider to select. The user interface enables content providers to target and bid on the plurality of tasks and subtasks generated by the models. The user interface can enable content providers to target these tasks and subtasks. For example, content providers can target specific tasks and/or sub-tasks for their campaigns. The content provider can target an entire task, a subset of tasks, and/or individual sub-tasks.

According to some embodiments, the search system can generate a dynamic search result page (SRP) using LLMs and the multi-task machine-learned models. For example, when a user types a broad and ambiguous query like "Paris", the system may be unsure if the user is searching for news, travel, weather, history, or some other information about Paris. In a conventional system, the SRP can be laid out with ordering intents based on user interaction. Therefore, if most users are looking for "travel" then that is the primary intent that is surfaced and a secondary intent, such as news, can be surfaced later.

In some instances, the multi-task machine-learned models can generate a user-tailored SRP based on the user's interactions. For example, when a user views content associated with things to do in Paris, the SRP can be updated to present more content about things to do in Paris. The multi-task machine-learned models can present more content in the in-stream based on earlier user interactions.

The search system, using machine-learned models (e.g., LLMs and/or multi-task machine-learned models), can restructure search pages based on user interactions. For example, a user can search for "Paris" and interact with the search results. The machine-learned models can auto-generate a prompt for the next page such as "user is looking for things to do in Paris." Therefore, when the user makes subsequent queries regarding "Paris", the LLM context and query is passed to extract additional information from the search system. As a result, the search system can generate SRP and sponsored content that is associated with things to do in Paris. Additionally, the search system enables this user context to be available to content providers to allow for better targeting.

Examples of the disclosure provide several technical effects, benefits, and/or improvements in computing technology and artificial intelligence techniques that involve the use of machine learning algorithms to auto-generate new data, such as tasks and subtasks associated with a user request. The techniques described herein improve the use of generative models by improving the quality of the generated content. The quality of generated content in a dynamic search result page is improved based on modifying the dynamic search result page based on user interaction. The dynamic search result page is modified, in part, based on the user interaction score of each subtask and/or content item. The quality of the generated content is tailored specifically to the user by using reinforcement learning from human feedback. For example, by using more content-relevant data, the system improves the performance of generative models.

Additionally, the system utilizes better training techniques by developing more efficient and effective training techniques that are specific to the user (e.g., based on reinforcement learning from human feedback) to reduce the time and resources required to train models. Moreover, the machine-learned models can be trained using a task-based approach, which further reduce the time and resources required to train models. Training the machine-learned models for the task-based approach models which enables the system train on specific terms associated with the plurality of tasks and the plurality of subtasks for each task. In contrast, the keywords associated with a query-based approach would require the training to be broader and consequently more resource intensive. The number of parameters associated with the tasks and the subtasks will be much smaller than the number of parameters that need to be trained for a query-based approach, thus reducing the time and resources to train the model.

In some instances, the multi-task machine-learned model can be trained using user interaction data, while the user interaction data is not used to train the general LLM to safeguard user privacy. For example, the user interaction data can include data from the user interacting with the search result page and can include data from the content provider interacting with the user interface to generate sponsored content associated with a specific subtask. Moreover, the system can incorporate user feedback and provide the feedback, via reinforcement learning or active learning, to generative models that can help the models learn from user preferences and improve over time. Furthermore, the present disclosure can reduce processing by reducing the number of manual inputs provided by a user and by reducing the number of interface screens which must be obtained, loaded, interacted with, and updated.

Furthermore, by enabling task-based searching, the search system increases the search space for potential search results by now being able to perform searches that may have been impossible to perform before. A task can be more abstract and overarching concepts in comparison to a query. For example, a task can include a plurality of subtasks, and a subtask can be a plurality of queries. In this search system, content providers can now target tasks and subtasks for sponsored content. Additionally, by being able to search for tasks and subtasks, a user is able to perform searches that were not possible with conventional search systems (e.g., query-only search). Moreover, the correct search results are provided faster to the user by reducing the number of interactions with the user. For example, based on user interaction with the SRP, the search system can dynamically update the search results so that the user can obtain the correct results, which reduces the number of responses provided to a user until the user is satisfied with the response. Furthermore, the system can provide task-based results to queries, which is much more desirable to users than a search that still requires the user to expend substantial time and energy conducting further research.

Another technical effect and benefit relate to improved computational efficiency and improvements in the functioning of a computing system. For example, the systems and methods disclosed herein can leverage the multi-task machine-learned models to provide more comprehensive results to a user that are tailored specifically to the user. Thus mitigating the use of additional searches and additional search result page browsing, which can save time, processing resources, energy, and computational power. Additional searches and search result pages are mitigated because the search result page is dynamically updated based on user interaction, thus a user can find the right solution without requiring additional searches or clicking to the next search result page.

Various example implementations are described herein with respect to the accompanying Figures. With reference now to the Figures, example embodiments of the present disclosure will be discussed in further detail.

FIG. 1 depicts a flow diagram of a search system with a multi-task machine-learned model according to example embodiments of the present disclosure. In the example illustrated in FIG. 1, the user request to the search engine can be "plan for a Paris trip." The search system, using LLMs and multi-task machine-learned models, can determine a plurality of tasks, such as flights to Paris, hotels in Paris, and so on. The search engine can perform a query for each of the tasks in the plurality of tasks to obtain the relevant information. The search engine can generate a web page having the plurality of tasks and the obtained information from each query.

According to some embodiments, the search engine described herein can generate better results to task-based queries using LLMs and multi-task machine-learned models. For example, as illustrated the flow chart diagram 100 in FIG. 1, in response to a "travel to Paris" task-based query 110, the search engine can generate subtasks for the travel plan with various links along the way for flights, hotels, things to do, and so on. The search system 120 can modify in real-time a page layout of the search result page based on the determined subtasks. For a high-level task, such as "plan for a Paris trip", the search system 120, using machine-learned models, can divide the high-level task into subtasks by determining a plurality of subtasks for the high-level task. The machine-learned models can include LLMs 122 and multi-task machine-learned models 124. The plurality of subtasks can include a first subtask 130, a second subtask 135, a third subtask 140, a fourth subtask 145, and so on. In this example, the first subtask 130 can be "flights to Paris," the second subtask 135 can be "hotels in Paris," the third subtask 140 can be "Restaurants in Paris," and the fourth subtask 145 can be "other relevant information about Paris." Subsequently, the search engine can generate a first search result page (SRP) 150 for the first subtask, a second SRP 155 for the second subtask, a third SRP 160 for the third subtask, and a fourth SRP 165 for the fourth subtask. In some instances, a first web page 170 can include the first SRP 150, the second SRP 155, the third SRP 160, and the fourth SRP 165. In another example, the first web page 170 may include a subset of the generated SRPs (e.g., the first SRP 150 and the second SRP 155).

Figure 2:
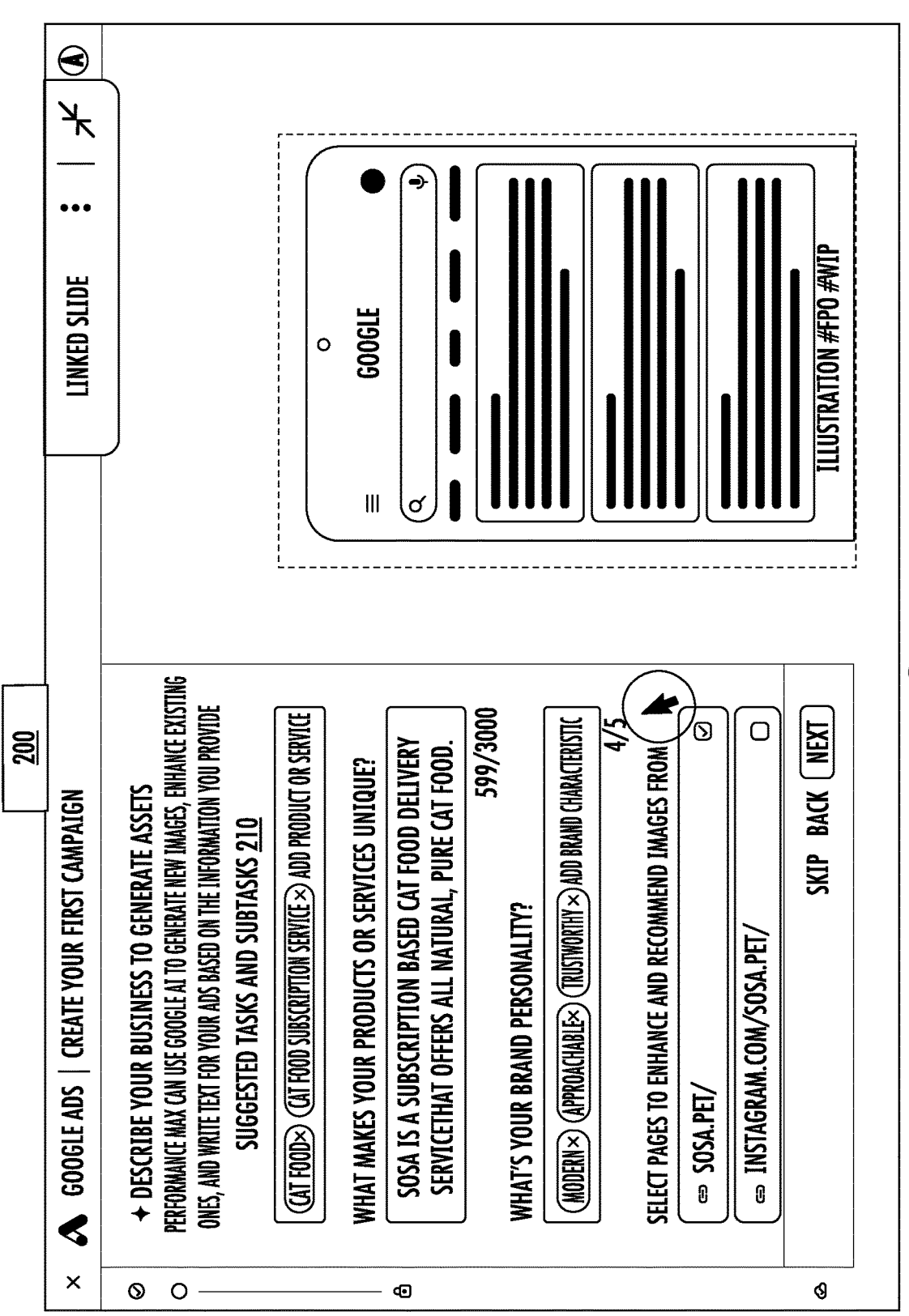
FIG. 2 depicts a user interface of a search system with a multi-task machine-learned model according to example embodiments of the present disclosure.

Similarly to conventional search targeting technologies, conventional user interfaces for sponsored content are designed for search queries and not tasks. With conventional user interfaces, sponsored content of a content provider is tailored to a query, such as a matching keyword in a search query. In contrast, as illustrated in FIG. 2, the user interface 200 for the content provider can be designed to target tasks and subtasks. For example, the user interface 200 can determine suggested tasks and subtasks 210 for the content provider to target. The suggested tasks and subtasks can be determined, using LLMs 122 and/or multi-task models 124, based on data obtained from the content provider. The data obtained from the content provider can be obtained from a website of the content provider and/or be inputted by the content provider in the user interface 200. Continuing with the example from FIG. 1, a first company (e.g., company for booking travel) can target subtasks for flight bookings and hotel bookings in the travel task (e.g., "Travel to Paris"

task). Additionally, a second company (e.g., airline company) may want to just target the flight bookings task.

FIG. 2 depicts a user interface of a search system with a multi-task machine-learned model according to example embodiments of the present disclosure. As illustrated in FIG. 2, the user interface 200 enables content providers to target sponsored content for entire tasks (e.g., "Travel to Paris) or subtasks generated by LLMs 122 and/or multi-task models 124. The user interface 200 can present suggested tasks and subtasks 210 that are generated by the search engine and enable the content provider to target and bid for these subtasks. The content providers can target individual subtasks, subset of subtasks, and/or the entire task.

Figure 3:
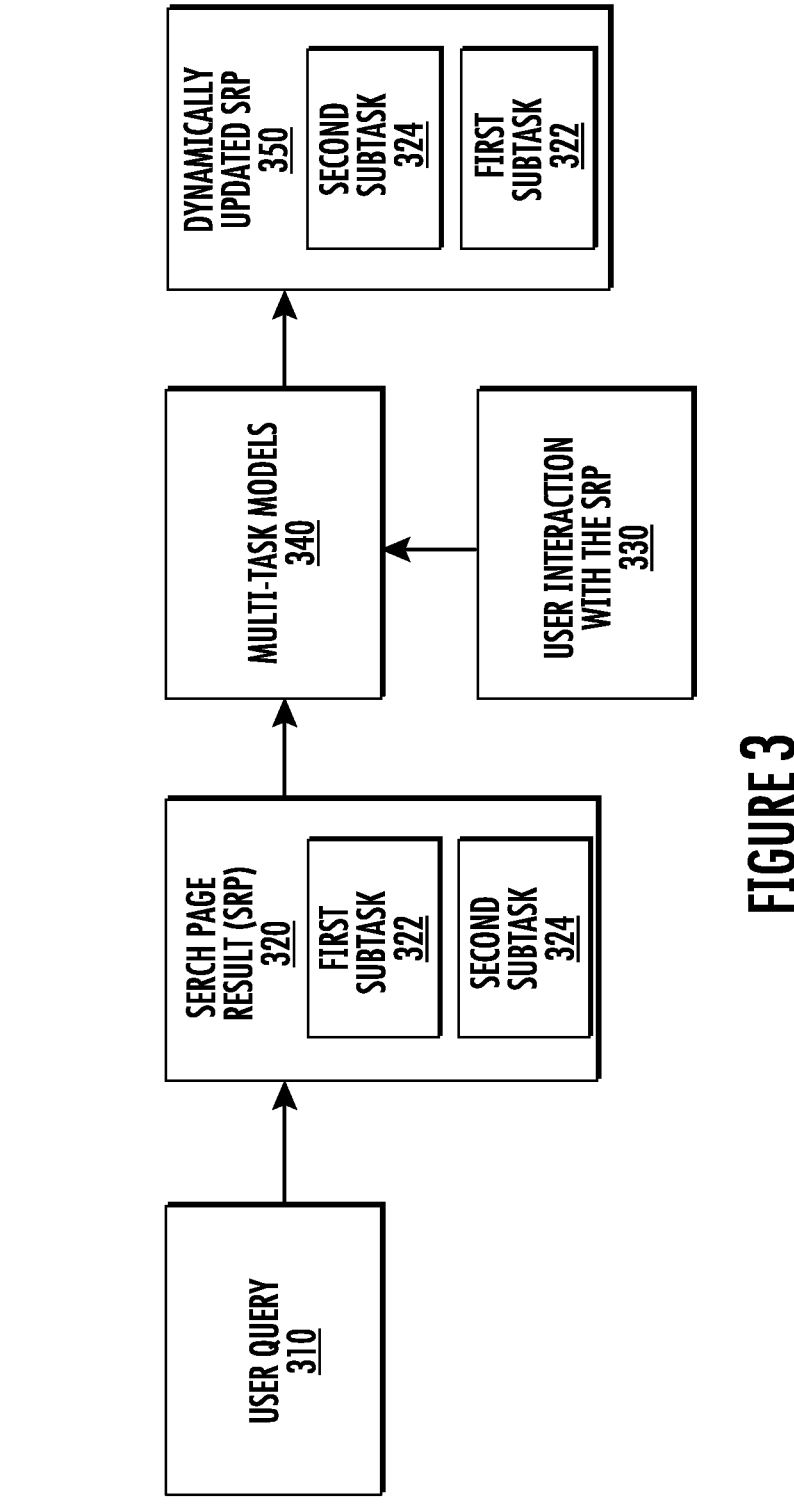
FIG. 3 depicts a flow diagram of a search system with a dynamic search result page according to example embodiments of the present disclosure.

FIG. 3 depicts a flow diagram 300 of a search system presenting a dynamic search result page (SRP) according to example embodiments of the present disclosure. The search system can perform a dynamic SRP contextualization using LLMs 122 and/or multi-task models 124.

For example, a user can enter a user query 310. In some instances, when the user query 310 is a broad query (e.g., "Paris"), the intent of the user may be unknown as the search system may not know if the user is looking for news, travel, weather, or some other aspects associated with the broad query. The search system can generate an SRP 320 with a page layout that is based on predicted subtasks of a plurality of users. The predicted subtask can be an aggregation of the subtasks of a plurality of users having a similar user query 310. The predicted subtask of the user can be ranked with the highest ranked intent being presented first. The subtasks can be ranked based on user interaction. Thus, when most users are looking for a first subtask 322 (e.g., "travel"), then the search system can present the first subtask 322 as the highest ranked in the SRP. Additionally, a second subtask 324 (e.g., news) can be the second highest ranked intent, and be presented after the first subtask.

According to some embodiments, the multi-task models 124 can be trained based on the user interaction 330 with the SRP. Continuing with the example, when a first user indicates that they are interested in a second subtask (e.g., "news about Paris"), then the SRP can dynamically be updated to be tailored to this second subtask based on the user's interactions. For example, when the user views more content associated with the second subtask in the SRP, then the SRP can be dynamically updated in real-time to show more content associated with the second subtask. Additionally, when the user scrolls down the webpage or clicks the next page of the search results, the search system can generate content items that are associated with the second subtask. The search system can generate content items instream based on earlier user interactions. The multi-task models 124 can determine the user intent is associated with a specific subtask and generate in real-time content items associated with the specific subtask. The search system can restructure search pages based on the specific subtask.

The search system provides standardized ways for passing query context using LLMs summary for advertisers to target. Aspects of the present disclosure provide a number of technical effects and benefits. As one example, the system and methods can improve search results by enabling multi-modal searching capabilities. By obtaining user verification of the classification of the object in the received image, the system can provide more accurate search results by enhancing the query with additional signals that provide helpful context for the search. In particular, the systems and methods disclosed herein can leverage an interactive user interface that enables a user to use image data to provide better, faster, and more accurate search results.

Example Methods

FIG. 4A depicts a flow chart diagram of an example method to perform a search with a server having a multi-task machine-learned model according to example embodiments of the present disclosure. Although FIG. 4A depicts steps performed in a particular order for purposes of illustration and discussion, the methods of the present disclosure are not limited to the particularly illustrated order or arrangement. The various steps of method 400 can be omitted, rearranged, combined, and/or adapted in various ways without deviating from the scope of the present disclosure.

The method 400 can be performed by a computing system such as the search system 120 in FIG. 1, the multi-task model(s) 340 in FIG. 2, multi-task machine-learned model 700, server computing system 830, sensor processing system 60, or output determination system 80.

At 402, a computing system (e.g., search system 120) can obtain a plurality of web resources (e.g., web pages) of a client account. The plurality of web resources can include a content item associated with the first product, a second content item associated with a second product, a third content item associated with a third product, and so on. In some instances, the system can crawl the web pages of a company to obtain a content item (e.g., product page) of a product. The company can have a client account with the search system. For example, the company can be a shoe company that has a webpage with a first product (e.g., running shoes), a webpage with a second product (e.g., dress shoes), and a webpage with a third product (e.g., casual shoes).

At 404, the system can determine, using one or more machine-learned models, that the first product is associated with a first task and the second product is associated with a second task. The one or more machine-learned models can include LLMs 122 and/or multi-task models 124.

At 406, the system can receive a first user query. The first user query can be associated with a task.

At 408, the system can determine, using one or more machine-learned models, a first subtask and a second subtask associated with the task that is received at operation 406. Additionally, the first subtask can have a first user interaction score that is higher than a second user interaction score associated with the second content item. The user interaction score can be calculated based on an aggregate score of user interaction with the corresponding subtask.

At 410, the system can perform a first query search for the first subtask to obtain a first content item associated with the first subtask. Additionally, the system can perform a second query search for the second subtask to obtain a second content item associated with the second subtask At 412, the system can cause a presentation, on a user interface displayed on a user device, of the first content item and the second content item, wherein the first content item is displayed above the second content item based on the first user interaction score being higher than the second user interaction score.

FIG. 4B depicts a flow chart diagram of an example method to generate sponsored content that can, using a multi-task machine-learned model, target tasks and/or subtasks according to example embodiments of the present disclosure. Although FIG. 4B depicts steps performed in a particular order for purposes of illustration and discussion, the methods of the present disclosure are not limited to the particularly illustrated order or arrangement. The various steps of method 450 can be omitted, rearranged, combined, and/or adapted in various ways without deviating from the scope of the present disclosure.

The method 450 can be performed by a computing system such as the search system 120 in FIG. 1, the multi-task model(s) 340 in FIG. 2, multi-task machine-learned model 700, server computing system 830, sensor processing system 60, or output determination system 80.

At 452, a computing system (e.g., search system 120) can receive, from a device of a client account, a request to present a sponsored content. The client account can be associated with a content provider (e.g., advertiser). The request can include a web resource, such as a Uniform Resource Locator (URL) of the content provider.

At 454, the system can obtain a plurality of content items from the web resource. The plurality of content items can include a first content item associated with first product, a second content item associated with a second product, and so on. For example, the first product can be running shoes, the second product can be dress shoes, and the third product can be sandals.

At 456, the system can process the first content item, using one or more machine-learned models, to determine that the first content item is associated with a first task and a first subtask of the first task. Continuing with the example at 454, the first task for the running shoes can be shoes, and the first subtask can be shoes for playing sport.

At 458, the system can process the second content item, using one or more machine-learned models, to determine that the second content item is associated with the first task and a second subtask of the first task. Continuing with the example at 454, the first task for the dress shoes can be shoes, and the second subtask can be shoes for work.

At 460, the system can cause a first presentation, on a display of the device, the first task and the first subtask as suggested targeting options for the first content item as the sponsored content. Continuing with the example at 454, the system can suggest to the content provider to target shoes and a shoes for playing sport for the first content item that is associated with running shoes. As illustrated in FIG. 2, the system can include a user interface with suggested tasks and subtasks 210.

At 462, the system can cause a second presentation, on the display of the device, the first task and the second subtask as suggested targeting options for the second content item as the sponsored content. Continuing with the example at 454, the system can suggest to the content provider to target shoes and a shoes for work for the second content item that is associated with dress shoes. As illustrated in FIG. 2, the system can include a user interface with suggested tasks and subtasks 210.

FIG. 5 depicts a flow chart diagram of an example method to generate a dynamic search result page according to example embodiments of the present disclosure. Although FIG. 5 depicts steps performed in a particular order for purposes of illustration and discussion, the methods of the present disclosure are not limited to the particularly illustrated order or arrangement. The various steps of method 500 can be omitted, rearranged, combined, and/or adapted in various ways without deviating from the scope of the present disclosure.

The method 500 can be performed by a computing system such as the search system 120 in FIG. 1, the multi-task model(s) 340 in FIG. 2, multi-task machine-learned model 700, server computing system 830, sensor processing system 60, or output determination system 80.

At 502, in response to the presentation of the first content item and the second content item, the system can receive a user interaction with the second content item.

At 504, the system can increase the second user interaction score associated with the second content item.

At 506, the system can receive a second user request associated with the query.

At 508, the system can cause a presentation, on a user interface displayed on a user device, of the first content item and the second content item, wherein the second content item is displayed above the first content item based on the second user interaction score being higher than the first user interaction score.

Figure 6:
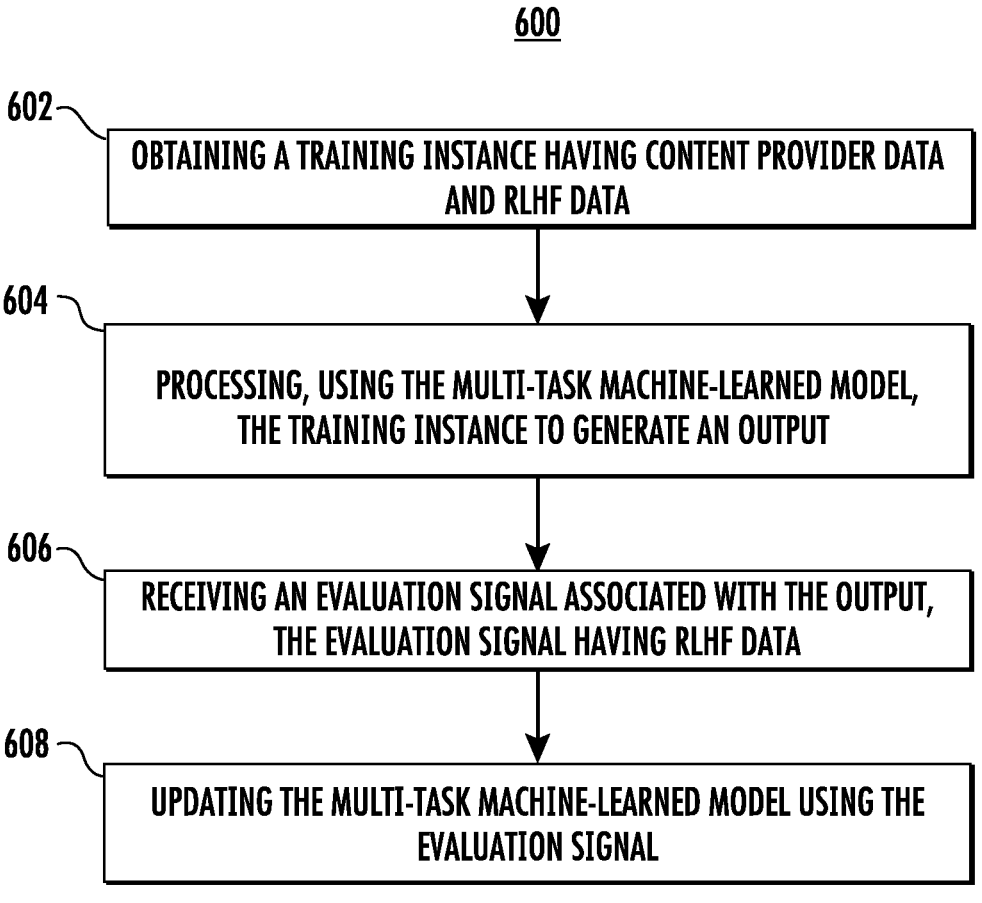
FIG. 6 is a flow chart diagram illustrating an example method for training a machine-learned model according to example implementations of aspects of the present disclosure.

FIG. 6 depicts a flowchart of a method 600 for training one or more machine-learned models according to aspects of the present disclosure. For instance, an example machine-learned model can include a multi-task model.

One or more portion(s) of example method 600 can be implemented by a computing system that includes one or more computing devices such as, for example, computing systems described with reference to the other figures. Each respective portion of example method 600 can be performed by any (or any combination) of one or more computing devices. Moreover, one or more portion(s) of example method 600 can be implemented on the hardware components of the device(s) described herein, for example, to train one or more systems or models. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 6 is described with reference to elements/terms described with respect to other systems and figures for exemplary illustrated purposes and is not meant to be limiting. One or more portions of example method 600 can be performed additionally, or alternatively, by other systems.

The multi-task model can be a machine-learned model that is tailored to a specific content provider by being trained based on data associated with the content provider. In some instances, the data associated with the content provider can be proprietary data and only used to train the multi-task model. In some instances, the multi-task model can be a combination of a search large language model and content provider specific model. The content provider specific model can be trained using data associated with the content provider. Additionally, the general LLM can be fine-tuned using the content provider specific model. The multi-task model, using the general LLM, can provide a response for tasks that have a minimum amount of data from the content provider. Moreover, the multi-task model, being trained using the content provider's data, can provide answers that are more accurate in comparison to a fine-tuned general model. The multi-task model can be an overall model for various content provider tasks such as, but not limited to, creative generation, intent generation, or task generation, and similar content-specific tasks. For example, the task generation can be a specific model that is tuned for overall flow and performance of the content provider. Moreover, one or more parameters of the multi-task model can be updated using reinforcement learning with Human Feedback (RLHF) data. The RLHF data can include advertiser flow data, advertiser feedback data, and other user data. The advertiser feedback data can include acceptance or rejection of suggestions proposed by the model. The RLHF data can be used for offline training of the multi-task model.

The multi-task model can be trained to generate tasks and/or subtasks that content providers can target. Additionally, the multi-task model can generate a plurality of tasks based on website information of the content provider and RLHF data. The RLHF data can be interaction data of users interacting with the websites of the content provider, search data of users interacting with search results, and/or campaign data of the content provider interacting with a sponsored content campaign. Moreover, the multi-task model can generate a plurality of subtasks associated with a task. The subtasks can be compatible with the terminology of the content provider, and the terminology of the industry associated with the content provider. Furthermore, the multi-task model is trained based on the content provider data and only used by the content provider, thus ensuring that sensitive information of the content provider is used solely for the purposes of the content provider. The sensitive information of the content provider may not be used for the training of the search LLM.

In some instances, the multi-task model can generate a subset of subtasks associated with a task. For example, when the task is "plan a trip," the subsets can include "flights and hotels," "hotel and rental cars," or "transportation and restaurants." The subsets can make it easier for a content provider to provide sponsored content.

At 602, example method 600 can include obtaining a training instance having content provider data and reinforcement learning from human feedback (RLHF) data. A set of training data can include content provider data and RLHF data. The set of training data can include a plurality of training instances divided between multiple datasets (e.g., a training dataset, a validation dataset, or testing dataset). A training instance can be labeled or unlabeled. Although referred to in example method 600 as a "training" instance, it is to be understood that runtime inferences can form training instances when a model is trained using an evaluation of the model's performance on that runtime instance (e.g., online training/learning). Example data types for the training instance and various tasks associated therewith are described throughout the present disclosure.

At 604, example method 600 can include processing, using the multi-task model (e.g., multi-task machine-learned model), the training instance to generate an output. The output can be directly obtained from the multi-task machine-learned model or can be a downstream result of a chain of processing operations that includes an output of the multi-task machine-learned model.

At 606, example method 600 can include receiving an evaluation signal associated with the output. The evaluation signal can include RLHF data. The evaluation signal can be obtained using a loss function. Various determinations of loss can be used, such as mean squared error, likelihood loss, cross entropy loss, hinge loss, contrastive loss, or various other loss functions. The evaluation signal can be computed using known ground-truth labels (e.g., supervised learning), predicted or estimated labels (e.g., semi- or self-supervised learning), or without labels (e.g., unsupervised learning). The evaluation signal can be a reward (e.g., for reinforcement learning). The reward can be computed using a machine-learned reward model configured to generate rewards based on output(s) received. The reward can be computed using feedback data describing human feedback on the output(s). The feedback data can include RLHF data.

At 608, example method 600 can include updating the multi-task machine-learned model using the evaluation signal. For example, values for parameters of the machine-learned model(s) can be learned, in some embodiments, using various training or learning techniques, such as, for example, backwards propagation. For example, the evaluation signal can be back propagated from the output (or another source of the evaluation signal) through the machine-learned model(s) to update one or more parameters of the model(s) (e.g., based on a gradient of the evaluation signal with respect to the parameter value(s)). For example, system(s) containing one or more machine-learned models can be trained in an end-to-end manner. Gradient descent techniques can be used to iteratively update the parameters over a number of training iterations. In some implementations, performing backwards propagation of errors can include performing truncated backpropagation through time. Example method 600 can include implementing a number of generalization techniques (e.g., weight decays, dropouts, etc.) to improve the generalization capability of the models being trained.

In some implementations, example method 600 can be implemented for training a multi-task machine-learned model from an initialized state to a fully trained state (e.g., when the model exhibits a desired performance profile, such as based on accuracy, precision, recall).

In some implementations, example method 600 can be implemented for particular stages of a training procedure. For instance, in some implementations, example method 600 can be implemented for pre-training a multi-task machine-learned model. Pre-training can include, for instance, large-scale training over potentially noisy data to achieve a broad base of performance levels across a variety of tasks/data types. In some implementations, example method 600 can be implemented for fine-tuning a multi-task machine-learned model and/or a search LLM. Fine-tuning can include, for instance, smaller-scale training on higher-quality (e.g., labeled, curated, etc.) data. Fine-tuning can affect all or a portion of the parameters of a machine-learned model. For example, various portions of the machine-learned model can be "frozen" for certain training stages. For example, parameters associated with an embedding space can be "frozen" during fine-tuning (e.g., to retain information learned from a broader domain(s) than present in the fine-tuning dataset(s)). An example fine-tuning approach includes reinforcement learning. Reinforcement learning can be based on RLHF data, such as user feedback on model performance during use.

Example Machine-Learned Models

Figure 7:
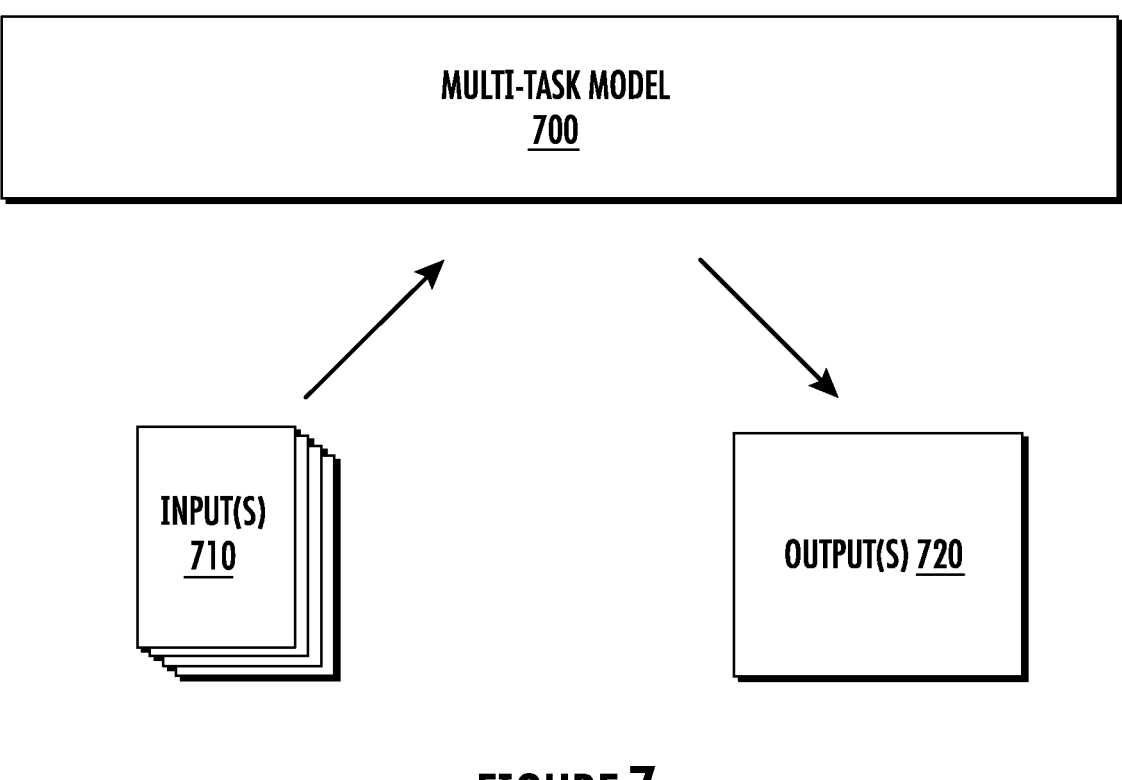
FIG. 7 is a block diagram of an example processing flow for using machine-learned model(s) to process input(s) to generate output(s) according to example implementations of aspects of the present disclosure.

FIG. 7 is a block diagram of an example processing flow for using a multi-task machine-learned model(s) 700 to process input(s) 710 to generate output(s) 730.

The multi-task machine-learned model(s) 700 can be or include one or multiple machine-learned models or model components. Example machine-learned models can include neural networks (e.g., deep neural networks). Example machine-learned models can include non-linear models or linear models. Example machine-learned models can use other architectures in lieu of or in addition to neural networks. Example machine-learned models can include decision tree based models, support vector machines, hidden Markov models, Bayesian networks, linear regression models, k-means clustering models, etc.

Example neural networks can include feed-forward neural networks, recurrent neural networks (RNNs), including long short-term memory (LSTM) based recurrent neural networks, convolutional neural networks (CNNs), diffusion models, generative-adversarial networks, or other forms of neural networks. Example neural networks can be deep neural networks. Some example machine-learned models can leverage an attention mechanism such as self-attention. For example, some example machine-learned models can include multi-headed self-attention models.

Machine-learned model(s) 700 can include a single or multiple instances of the same model configured to operate on data from input(s) 2. Machine-learned model(s) 700 can include an ensemble of different models that can cooperatively interact to process data from input(s) 2. For example, machine-learned model(s) 700 can employ a mixture-of-experts structure.

Input(s) 710 can generally include or otherwise represent various types of data. Input(s) 710 can include one type or many different types of data. Output(s) 720 can be data of the same type(s) or of different types of data as compared to input(s) 2. Output(s) 720 can include one type or many different types of data.

Example data types for input(s) 710 or output(s) 720 include natural language text data, software code data (e.g., source code, object code, machine code, or any other form of computer-readable instructions or programming languages), machine code data (e.g., binary code, assembly code, or other forms of machine-readable instructions that can be executed directly by a computer's central processing unit), assembly code data (e.g., low-level programming languages that use symbolic representations of machine code instructions to program a processing unit), genetic data or other chemical or biochemical data, image data, audio data, audiovisual data, haptic data, biometric data, medical data, financial data, statistical data, geographical data, astronomical data, historical data, sensor data generally (e.g., digital or analog values, such as voltage or other absolute or relative level measurement values from a real or artificial input, such as from an audio sensor, light sensor, displacement sensor, etc.), and the like. Data can be raw or processed and can be in any format or schema.

In multimodal inputs 710 or outputs 3, example combinations of data types include image data and audio data, image data and natural language data, natural language data and software code data, image data and biometric data, sensor data and medical data, etc. It is to be understood that any combination of data types in an input 710 or an output 720 can be present.

An example input 710 can include one or multiple data types, such as the example data types noted above. An example output 720 can include one or multiple data types, such as the example data types noted above. The data type(s) of input 710 can be the same as or different from the data type(s) of output 3. It is to be understood that the example data types noted above are provided for illustrative purposes only. Data types contemplated within the scope of the present disclosure are not limited to those examples noted above.

Example Methods

Figure 8A:
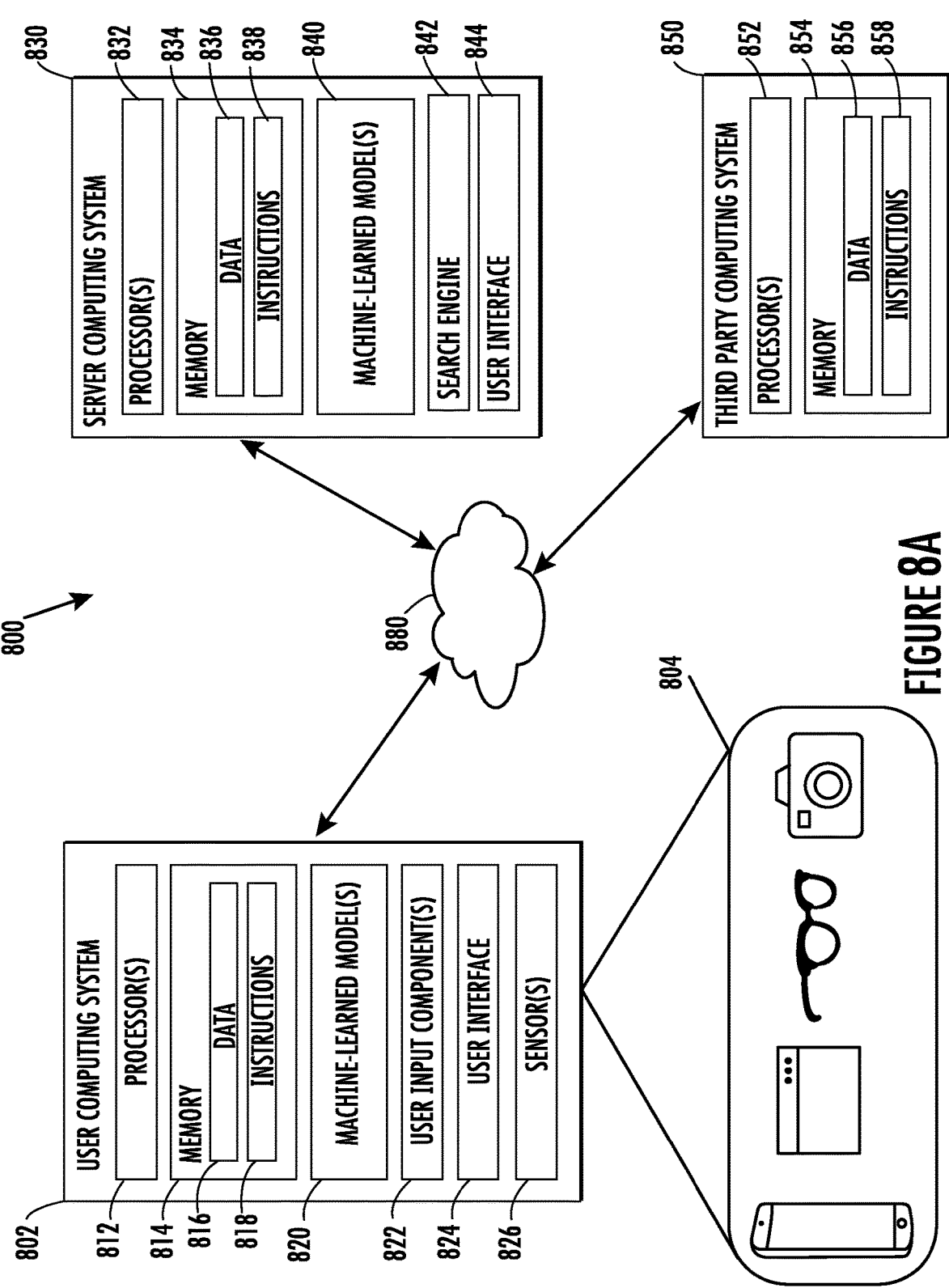
FIG. 8A depicts a block diagram of an example computing system that performs a multimodal search according to example embodiments of the present disclosure.

FIG. 8A depicts a block diagram of an example search system 120 that performs a search according to example embodiments of the present disclosure. The system 800 includes a user computing system 802, a server computing system 830, and/or a third computing system 850 that are communicatively coupled over a network 880.

The user computing system 802 can include any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing system 802 includes one or more processors 812 and a memory 814. The one or more processors 812 can be any suitable processing device (e.g., a processor core, a microprocessor, an ASIC, a FPGA, a controller, a microcontroller, etc.) and can be one processor or a plurality of processors that are operatively connected. The memory 814 can include one or more non-transitory computer-readable storage mediums, such as RAM, ROM, EEPROM, EPROM, flash memory devices, magnetic disks, etc., and combinations thereof. The memory 814 can store data 816 and instructions 818 which are executed by the processor 812 to cause the user computing system 802 to perform operations.

In some implementations, the user computing system 802 can store or include one or more machine-learned models 820. For example, the machine-learned models 820 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. The machine-learned models 820 can be an example of the LLMs 122, the multi-task models 124, multi-task models 340, multi-task model 700 and/or the machine-learned models used in methods 400, 500, and 600.

In some implementations, the one or more machine-learned models 820 can be received from the server computing system 830 over network 880, stored in the user computing device memory 814, and then used or otherwise implemented by the one or more processors 812. In some implementations, the user computing system 802 can implement multiple parallel instances of a single machine-learned model 820 (e.g., to perform parallel machine-learned model processing across multiple instances of input data and/or detected features).

More particularly, the one or more machine-learned models 820 may include one or more detection models, one or more classification models, one or more segmentation models, one or more augmentation models, one or more generative models, one or more natural language processing models, one or more optical character recognition models, and/or one or more other machine-learned models. The one or more machine-learned models 820 can include one or more transformer models. The one or more machine-learned models 820 may include one or more neural radiance field models, one or more diffusion models, and/or one or more autoregressive language models.

The one or more machine-learned models 820 may be utilized to detect one or more object features. The detected object features may be classified and/or embedded. The classification and/or the embedding may then be utilized to perform a search to determine one or more search results. Alternatively and/or additionally, the one or more detected features may be utilized to determine an indicator (e.g., a user interface element that indicates a detected feature) is to be provided to indicate a feature has been detected. The user may then select the indicator to cause a feature classification, embedding, and/or search to be performed. In some implementations, the classification, the embedding, and/or the searching can be performed before the indicator is selected.

In some implementations, the one or more machine-learned models 820 can process image data, text data, audio data, and/or latent encoding data to generate output data that can include image data, text data, audio data, and/or latent encoding data. The one or more machine-learned models 820 may perform optical character recognition, natural language processing, image classification, object classification, text classification, audio classification, context determination, action prediction, image correction, image augmentation, text augmentation, sentiment analysis, object detection, error detection, inpainting, video stabilization, audio correction, audio augmentation, and/or data segmentation (e.g., mask based segmentation).

Additionally or alternatively, one or more machine-learned models 840 can be included in or otherwise stored and implemented by the server computing system 830 that communicates with the user computing system 802 according to a client-server relationship. For example, the machine-learned models 840 can be implemented by the server computing system 840 as a portion of a web service (e.g., a viewfinder service, a visual search service, an image processing service, an ambient computing service, and/or an overlay application service). Thus, one or more models 820 can be stored and implemented at the user computing system 802 and/or one or more models 840 can be stored and implemented at the server computing system 830.

The user computing system 802 can also include one or more user input components 822 that receives user input. For example, the user input component 822 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

In some implementations, the user computing system can store and/or provide one or more user interfaces 824, which may be associated with one or more applications. The one or more user interfaces 824 can be configured to receive inputs and/or provide data for display (e.g., image data, text data, audio data, one or more user interface elements, an augmented-reality experience, a virtual reality experience, and/or other data for display. The user interface 824 may be associated with one or more other computing systems (e.g., server computing system 830 and/or third party computing system 850). The user interfaces 824 can include a viewfinder interface, a search interface, a generative model interface, a social media interface, and/or a media content gallery interface.

The user computing system 802 may include and/or receive data (e.g., image data 202, audio data 204) from one or more sensors 826. The one or more sensors 826 may be housed in a housing component that houses the one or more processors 812, the memory 814, and/or one or more hardware components, which may store, and/or cause to perform, one or more software packets. The one or more sensors 826 can include one or more image sensors (e.g., a camera), one or more lidar sensors, one or more audio sensors (e.g., a microphone), one or more inertial sensors (e.g., inertial measurement unit), one or more biological sensors (e.g., a heart rate sensor, a pulse sensor, a retinal sensor, and/or a fingerprint sensor), one or more infrared sensors, one or more location sensors (e.g., GPS), one or more touch sensors (e.g., a conductive touch sensor and/or a mechanical touch sensor), and/or one or more other sensors. The one or more sensors can be utilized to obtain data associated with a user's environment (e.g., an image of a user's environment, a recording of the environment, and/or the location of the user).

The user computing system 802 may include, and/or pe part of, a user computing device 804. The user computing device 804 may include a mobile computing device (e.g., a smartphone or tablet), a desktop computer, a laptop computer, a smart wearable, and/or a smart appliance. Additionally and/or alternatively, the user computing system may obtain from, and/or generate data with, the one or more one or more user computing devices 804. For example, a camera of a smartphone may be utilized to capture image data descriptive of the environment, and/or an overlay application of the user computing device 804 can be utilized to track and/or process the data being provided to the user. Similarly, one or more sensors associated with a smart wearable may be utilized to obtain data about a user and/or about a user's environment (e.g., image data can be obtained with a camera housed in a user's smart glasses). Additionally and/or alternatively, the data may be obtained and uploaded from other user devices that may be specialized for data obtainment or generation.

The server computing system 830 includes one or more processors 832 and a memory 834. The one or more processors 832 can be any suitable processing device (e.g., a processor core, a microprocessor, an ASIC, a FPGA, a controller, a microcontroller, etc.) and can be one processor or a plurality of processors that are operatively connected. The memory 834 can include one or more non-transitory computer-readable storage mediums, such as RAM, ROM, EEPROM, EPROM, flash memory devices, magnetic disks, etc., and combinations thereof. The memory 834 can store data 836 and instructions 838 which are executed by the processor 832 to cause the server computing system 830 to perform operations.

In some implementations, the server computing system 830 includes or is otherwise implemented by one or more server computing devices. In instances in which the server computing system 830 includes plural server computing devices, such server computing devices can operate according to sequential computing architectures, parallel computing architectures, or some combination thereof.

As described above, the server computing system 830 can store or otherwise include one or more machine-learned models 840. For example, the models 840 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 840 are discussed with reference to FIG. 8B. The machine-learned models 840 can be an example of the LLMs 122, the multi-task models 124, multi-task models 340, multi-task model 700 and/or the machine-learned models used in methods 400, 500, and 600.

Additionally and/or alternatively, the server computing system 830 can include and/or be communicatively connected with a search engine 842 that may be utilized to crawl one or more databases (and/or resources). The search engine 842 can process data from the user computing system 802, the server computing system 830, and/or the third party computing system 850 to determine one or more search results associated with the input data. The search engine 842 may perform term based search, label based search, Boolean based searches, image search, embedding based search (e.g., nearest neighbor search), multimodal search, and/or one or more other search techniques.

The server computing system 830 may store and/or provide one or more user interfaces 844 for obtaining input data and/or providing output data to one or more users. The one or more user interfaces 844 can include one or more user interface elements, which may include input fields, navigation tools, content chips, selectable tiles, widgets, data display carousels, dynamic animation, informational pop-ups, image augmentations, text-to-speech, speech-to-text, augmented-reality, virtual-reality, feedback loops, and/or other interface elements.

The user computing system 802 and/or the server computing system 830 can train the models 820 and/or 840 via interaction with the third party computing system 850 that is communicatively coupled over the network 880. The third party computing system 850 can be separate from the server computing system 830 or can be a portion of the server computing system 830. Alternatively and/or additionally, the third party computing system 850 may be associated with one or more web resources, one or more web platforms, one or more other users, and/or one or more contexts.

The third party computing system 850 can include one or more processors 852 and a memory 854. The one or more processors 852 can be any suitable processing device (e.g., a processor core, a microprocessor, an ASIC, a FPGA, a controller, a microcontroller, etc.) and can be one processor or a plurality of processors that are operatively connected. The memory 854 can include one or more non-transitory computer-readable storage mediums, such as RAM, ROM, EEPROM, EPROM, flash memory devices, magnetic disks, etc., and combinations thereof. The memory 854 can store data 856 and instructions 858 which are executed by the processor 852 to cause the third party computing system 850 to perform operations. In some implementations, the third party computing system 850 includes or is otherwise implemented by one or more server computing devices.

The network 880 can be any type of communications network, such as a local area network (e.g., intranet), wide area network (e.g., Internet), or some combination thereof and can include any number of wired or wireless links. In general, communication over the network 880 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data (e.g., image data 202). The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data (e.g., audio data 204). The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be sensor data (e.g., image data 202, audio data 204). The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes visual data (e.g., image data 202) and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

The user computing system may include a number of applications (e.g., applications 1 through N). Each application may include its own respective machine learning library and machine-learned model(s). For example, each application can include a machine-learned model. Example applications include a text messaging application, an email application, a dictation application, a virtual keyboard application, a browser application, etc.

Each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

The user computing system 802 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing system 800.

The central intelligence layer can communicate with a central device data layer. The central device data layer can be a centralized repository of data for the computing system 800. The central device data layer may communicate with a number of other components of the computing device, such as, for example, one or more sensors, a context manager, a device state component, and/or additional components. In some implementations, the central device data layer can communicate with each device component using an API (e.g., a private API).

Figure 8B:
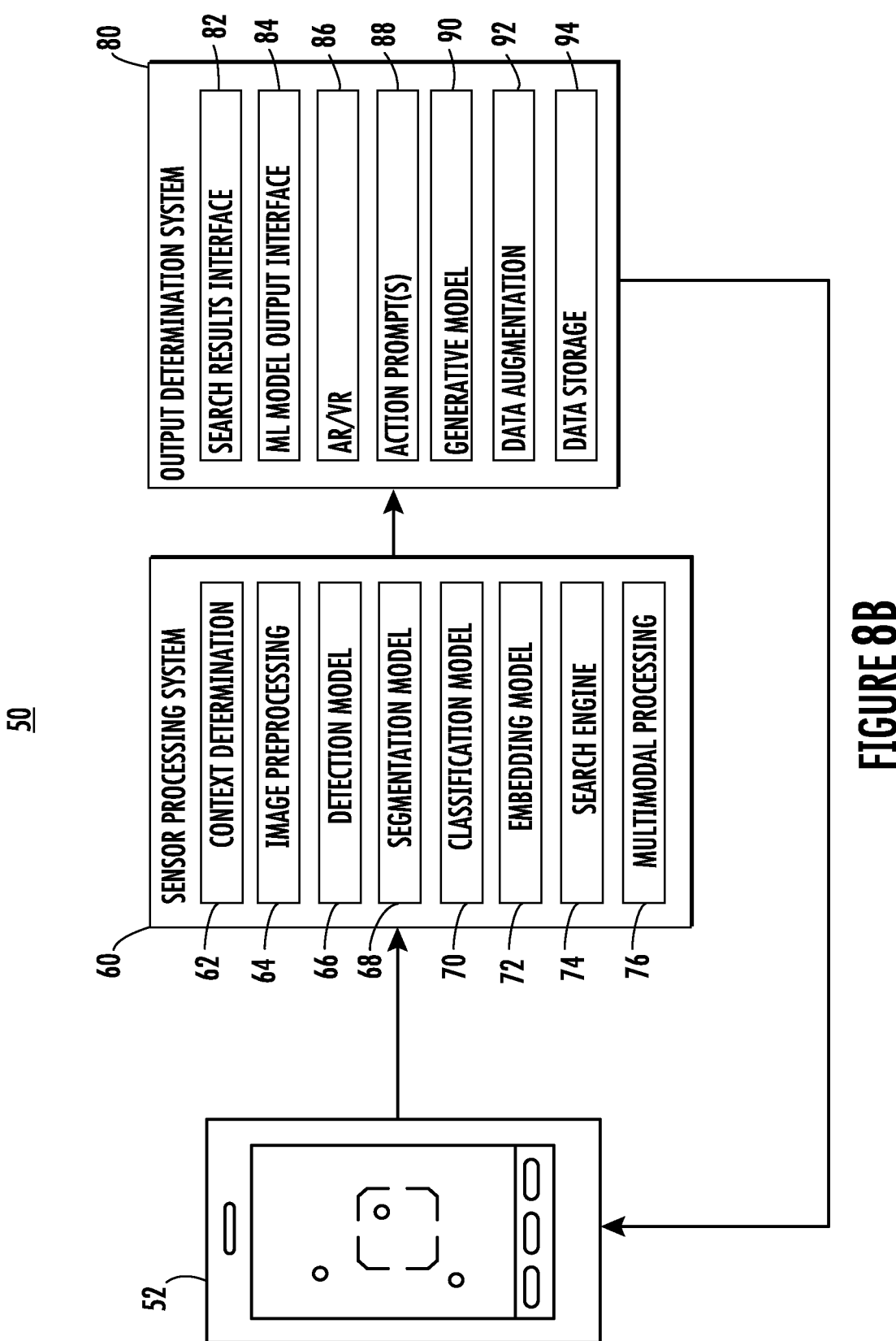
FIG. 8B depicts a block diagram of an example computing system that performs a multimodal search according to example embodiments of the present disclosure.

FIG. 8B depicts a block diagram of an example computing system 50 that performs a multimodal search according to example embodiments of the present disclosure. In particular, the example computing system 50 can include one or more computing devices 52 that can be utilized to obtain, and/or generate, one or more datasets that can be processed by a sensor processing system 60 and/or an output determination system 80 to feedback to a user that can provide information on features in the one or more obtained datasets. The one or more datasets can include image data, text data, audio data, multimodal data, latent encoding data, etc. The one or more datasets may be obtained via one or more sensors associated with the one or more computing devices 52 (e.g., one or more sensors in the computing device 52). Additionally and/or alternatively, the one or more datasets can be stored data and/or retrieved data (e.g., data retrieved from a web resource). For example, images, text, and/or other content items may be interacted with by a user. The interaction with content items can then be utilized to generate one or more determinations.

The one or more computing devices 52 can obtain, and/or generate, one or more datasets based on image capture, sensor tracking, data storage retrieval, content download (e.g., downloading an image or other content item via the internet from a web resource), and/or via one or more other techniques. The one or more datasets can be processed with a sensor processing system 60. The sensor processing system 60 may perform one or more processing techniques using one or more machine-learned models, one or more search engines, and/or one or more other processing techniques. The one or more processing techniques can be performed in any combination and/or individually. The one or more processing techniques can be performed in series and/or in parallel. In particular, the one or more datasets can be processed with a context determination block 62, which may determine a context associated with one or more content items. The context determination block 62 may identify and/or process metadata, user profile data (e.g., preferences, user search history, user browsing history, user purchase history, and/or user input data), previous interaction data, global trend data, location data, time data, and/or other data to determine a particular context associated with the user. The context can be associated with an event, a determined trend, a particular action, a particular type of data, a particular environment, and/or another context associated with the user and/or the retrieved or obtained data.

The sensor processing system 60 may include an image preprocessing block 64. The image preprocessing block 64 may be utilized to adjust one or more values of an obtained and/or received image to prepare the image to be processed by one or more machine-learned models and/or one or more search engines 74. The image preprocessing block 64 may resize the image, adjust saturation values, adjust resolution, strip and/or add metadata, and/or perform one or more other operations.

In some implementations, the sensor processing system 60 can include one or more machine-learned models, which may include a detection model 66, a segmentation model 68, a classification model 70, an embedding model 72, and/or one or more other machine-learned models. For example, the sensor processing system 60 may include one or more detection models 66 that can be utilized to detect particular features in the processed dataset. In particular, one or more images can be processed with the one or more detection models 66 to generate one or more bounding boxes associated with detected features in the one or more images.

Additionally and/or alternatively, one or more segmentation models 68 can be utilized to segment one or more portions of the dataset from the one or more datasets. For example, the one or more segmentation models 68 may utilize one or more segmentation masks (e.g., one or more segmentation masks manually generated and/or generated based on the one or more bounding boxes) to segment a portion of an image, a portion of an audio file, and/or a portion of text. The segmentation may include isolating one or more detected objects and/or removing one or more detected objects from an image.

The one or more classification models 70 can be utilized to process image data, text data, audio data, latent encoding data, multimodal data, and/or other data to generate one or more classifications. The one or more classification models 70 can include one or more image classification models, one or more object classification models, one or more text classification models, one or more audio classification models, and/or one or more other classification models. The one or more classification models 70 can process data to determine one or more classifications.

In some implementations, data may be processed with one or more embedding models 72 to generate one or more embeddings (e.g., text embeddings 112, image embeddings 114). For example, one or more images can be processed with the one or more embedding models 72 to generate one or more image embeddings (e.g., image embeddings 114) in an embedding space. The one or more image embeddings may be associated with one or more image features of the one or more images. In some implementations, the one or more embedding models 72 may be configured to process multimodal data to generate multimodal embeddings. The one or more embeddings can be utilized for classification, search, and/or learning embedding space distributions.

The sensor processing system 60 may include one or more search engines 74 that can be utilized to perform one or more searches. The one or more search engines 74 may crawl one or more databases (e.g., one or more local databases, one or more global databases, one or more private databases, one or more public databases, one or more specialized databases, and/or one or more general databases) to determine one or more search results. The one or more search engines 74 may perform feature matching, text based search, embedding based search (e.g., k-nearest neighbor search), metadata based search, multimodal search, web resource search, image search, text search, and/or application search.

Additionally and/or alternatively, the sensor processing system 60 may include one or more multimodal processing blocks 76, which can be utilized to aid in the processing of multimodal data. The one or more multimodal processing blocks 76 may include generating a multimodal query and/or a multimodal embedding to be processed by one or more machine-learned models and/or one or more search engines 74.

The output(s) of the sensor processing system 60 can then be processed with an output determination system 80 to determine one or more outputs to provide to a user. The output determination system 80 may include heuristic based determinations, machine-learned model based determinations, user selection based determinations, and/or context based determinations.

The output determination system 80 may determine how and/or where to provide the one or more search results in a search results interface 82. Additionally and/or alternatively, the output determination system 80 may determine how and/or where to provide the one or more machine-learned model outputs in a machine-learned model output interface 84. In some implementations, the one or more search results and/or the one or more machine-learned model outputs may be provided for display via one or more user interface elements. The one or more user interface elements may be overlayed over displayed data. For example, one or more detection indicators may be overlayed over detected objects in a viewfinder. The one or more user interface elements may be selectable to perform one or more additional searches and/or one or more additional machine-learned model processes. In some implementations, the user interface elements may be provided as specialized user interface elements for specific applications and/or may be provided uniformly across different applications. The one or more user interface elements can include pop-up displays, interface overlays, interface tiles and/or chips, carousel interfaces, audio feedback, animations, interactive widgets, and/or other user interface elements.

Additionally and/or alternatively, data associated with the output(s) of the sensor processing system 60 may be utilized to generate and/or provide an augmented-reality experience and/or a virtual-reality experience 86. For example, the one or more obtained datasets may be processed to generate one or more augmented-reality rendering assets and/or one or more virtual-reality rendering assets, which can then be utilized to provide an augmented-reality experience and/or a virtual-reality experience 86 to a user. The augmented-reality experience may render information associated with an environment into the respective environment. Alternatively and/or additionally, objects related to the processed dataset(s) may be rendered into the user environment and/or a virtual environment. Rendering dataset generation may include training one or more neural radiance field models to learn a three-dimensional representation for one or more objects.

In some implementations, one or more action prompts 88 may be determined based on the output(s) of the sensor processing system 60. For example, a search prompt, a purchase prompt, a generate prompt, a reservation prompt, a call prompt, a redirect prompt, and/or one or more other prompts may be determined to be associated with the output(s) of the sensor processing system 60. The one or more action prompts 88 may then be provided to the user via one or more selectable user interface elements. In response to a selection of the one or more selectable user interface elements, a respective action of the respective action prompt may be performed (e.g., a search may be performed, a purchase application programming interface may be utilized, and/or another application may be opened).

In some implementations, the one or more datasets and/or the output(s) of the sensor processing system 60 may be processed with one or more generative models 90 to generate a model-generated content item that can then be provided to a user. The generation may be prompted based on a user selection and/or may be automatically performed (e.g., automatically performed based on one or more conditions, which may be associated with a threshold amount of search results not being identified).

The output determination system 80 may process the one or more datasets and/or the output(s) of the sensor processing system 60 with a data augmentation block 92 to generate augmented data. For example, one or more images can be processed with the data augmentation block 92 to generate one or more augmented images. The data augmentation can include data correction, data cropping, the removal of one or more features, the addition of one or more features, a resolution adjustment, a lighting adjustment, a saturation adjustment, and/or other augmentation.

In some implementations, the one or more datasets and/or the output(s) of the sensor processing system 60 may be stored based on a data storage block 94 determination.

The output(s) of the output determination system 80 can then be provided to a user via one or more output components of the user computing device 52. For example, one or more user interface elements associated with the one or more outputs can be provided for display via a visual display of the user computing device 52.

The processes may be performed iteratively and/or continuously. One or more user inputs to provide user interface elements may condition and/or affect successive processing loops.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computing system, comprising:

one or more processors; and one or more non-transitory computer-readable media storing instructions that are executable by the one or more processors to cause the computing system to perform operations, the operations comprising:

receiving, from a user device, a first user query;

determining, using a large language model, that the first user query is associated with a task;

processing the user query using a multi-task machine-learned model when determined that the user query is associated with the task;

determining, using a multi-task machine-learned model, a first subtask and a second subtask associated with the task, wherein a first user interaction score associated with the first subtask is higher than a second user interaction score associated with the second subtask;

performing, using the multi-task machine-learned model, a first query search for the first subtask to obtain a first content item associated with the first subtask;

performing, using the multi-task machine-learned model, a second query search for the second subtask to obtain a second content item associated with the second subtask;

causing a presentation, on a display of the user device, of a search result page, the search result page displaying the first content item and the second content item;

increasing the second user interaction score in response to receiving a user interaction with the second content item; and dynamically updating the search result page to include a third content item as the search result page is being scrolled, the third content item being associated with the second subtask.

2. The computing system of claim 1, wherein the operations comprise:

obtaining, from a content provider, a plurality of web resources of a client account, wherein the plurality of web resources includes the first content item associated with first product and the second content item associated with a second product; and determining, using one or more machine-learned models, that the first product is associated with a first subtask and the second product is associated with a second subtask, wherein the first content item is presented on the display of the user device.

3. The computing system of claim 2, wherein the operations comprise:

causing a presentation, on a user interface of the content provider, the first subtask as a potential targeting of a sponsored content for the first content item.

4. The computing system of claim 2, wherein the one or more machine-learned models include a multi-task machine-learned model, and wherein the multi-task machine-learned model is trained using content provider data of the content provider.

5. The computing system of claim 1, wherein the operations comprise:

in response to the presentation of the first content item and the second content item, receiving a user interaction with the second content item;

increasing the second user interaction score associated with the second content item;

receiving, from the user device, a second user request associated with the task;

causing a presentation, on the display of the user device, of the first content item and the second content item, wherein the second content item is displayed above the first content item based on the second user interaction score being higher than the first user interaction score.

6. The computing system of claim 5, wherein the one or more machine-learned models include a multi-task machine-learned model, and wherein the multi-task machine-learned model is trained using reinforcement learning from human feedback (RLHF) data, the RLHF data including the user interaction with the second content item.

7. The computing system of claim 1, wherein the operations comprise:

receiving, from the user device, a scrolling command associated with scrolling of a search result page.

8. The computing system of claim 1, wherein the operations comprise:

in response to the presentation of the first content item and the second content item in a first search result page, receiving a user interaction with the second content item;

increasing the second user interaction score associated with the second content item;

receiving, from the user device, a next page command associated with presenting a second search result page; and generating the second search result page, wherein the second search result page includes a third content item, the third content item being associated with the second subtask.

9. The computing system of claim 1, wherein the operations comprise:

receiving, from the user device, a second user request;

processing the second user query, using one or more machine-learned models, to determine whether is associated with one or more tasks; and based on the determination that the second user query is not associated with the one or more tasks, process the second user query, using a large language model, to determine a response to the second user query.

10. The computing system of claim 1, wherein the one or more machine-learned models includes a multi-task machine-learned model and a large language model.

11. The computing system of claim 10, wherein the multi-task machine-learned model generates a search result page based on user interactions.

12. The computing system of claim 11, wherein the search result page includes a sponsored content that is associated with the first subtask, the sponsored content being generated by the multi-task machine-learned model based on a user interaction with the first content item.

13. The computer system of claim 1, wherein the first user interaction score is calculated based on an aggregation of user interactions with content items associated with the first subtask.

14. The computer system of claim 13, wherein the first user interaction score is updated based on the user device interacting with the first content item.

15. The computing system of claim 1, wherein the operation further comprises:

updating a parameter of the multi-task machine-learned model based on the user interaction.

16. The computing system of claim 1, wherein the operations further comprises:

generating, using the multi-task machine-learned model, the first subtask and the second subtask based on the task; and presenting the first subtask and the second subtask to a content provider.

17. A computer-implemented method, the method comprising:

receiving, by a computing system comprising one or more processors, a first user query from a user device;

determining, using a large language model, that the first user query is associated with a task;

processing the user query using a multi-task machine-learned model when determined that the user query is associated with the task;

determining, using a multi-task machine-learned model, a first subtask and a second subtask associated with the task, wherein a first user interaction score associated with the first subtask is higher than a second user interaction score associated with the second subtask;

performing, using the multi-task machine-learned model, a first query search for the first subtask to obtain a first content item associated with the first subtask;

performing, using the multi-task machine-learned model, a second query search for the second subtask to obtain a second content item associated with the second subtask; and causing a presentation, on a display of the user device, of a search result page, the search result page displaying the first content item and the second content item;

increasing the second user interaction score in response to receiving a user interaction with the second content item; and dynamically updating the search result page to include a third content item as the search result page is being scrolled, the third content item being associated with the second subtask.

18. The method of claim 17, further comprising:

obtaining, from a content provider, a plurality of web resources of a client account, wherein the plurality of web resources includes the first content item associated with first product and the second content item associated with a second product; and determining, using one or more machine-learned models, that the first product is associated with a first subtask and the second product is associated with a second subtask, wherein the first content item is presented on the display of the user device, wherein the one or more machine-learned models include a multi-task machine-learned model, and wherein the multi-task machine-learned model is trained using content provider data of the content provider.

19. The method of claim 17, further comprising:

receiving, from the user device, a second user request associated with the task;

causing a presentation, on the display of the user device, of the first content item and the second content item, wherein the second content item is displayed above the first content item based on the second user interaction score being higher than the first user interaction score, wherein the one or more machine-learned models include a multi-task machine-learned model, and wherein the multi-task machine-learned model is trained using reinforcement learning from human feedback (RLHF) data, the RLHF data including the user interaction with the second content item.

20. One or more non-transitory computer-readable media that collectively store instructions that, when executed by one or more computing devices, cause the one or more computing devices to perform operations, the operations comprising:

receiving a first user query from a user device;

determining, using a large language model, that the first user query is associated with a task;

processing the user query using a multi-task machine-learned model when determined that the user query is associated with the task;

determining, using a multi-task machine-learned model, a first subtask and a second subtask associated with the task, wherein a first user interaction score associated with the first subtask is higher than a second user interaction score associated with the second subtask;

performing, using the multi-task machine-learned model, a first query search for the first subtask to obtain a first content item associated with the first subtask;

performing, using the multi-task machine-learned model, a second query search for the second subtask to obtain a second content item associated with the second subtask; and causing a presentation, on a display of the user device, of a search result page, the search result page displaying the first content item and the second content item;

increasing the second user interaction score in response to receiving a user interaction with the second content item; and dynamically updating the search result page to include a third content item as the search result page is being scrolled, the third content item being associated with the second subtask.

* * * * *